US012087225B1

(12) United States Patent
Hu

(10) Patent No.: US 12,087,225 B1
(45) Date of Patent: Sep. 10, 2024

(54) PIXEL CIRCUIT OF DISPLAY PANEL

(71) Applicant: NOVATEK Microelectronics Corp., Hsin-Chu (TW)

(72) Inventor: Yi-Jiang Hu, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 16 days.

(21) Appl. No.: 18/119,269

(22) Filed: Mar. 8, 2023

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01)

(58) Field of Classification Search
CPC ......... G09G 3/3233; G09G 2300/0819; G09G 2300/0842; G09G 2310/08; G09G 2320/0233
See application file for complete search history.

(56) References Cited

U.S. PATENT DOCUMENTS

2024/0144884 A1* 5/2024 Lu ........................ G09G 3/3258
2024/0153457 A1* 5/2024 Yin ...................... G09G 3/3233

* cited by examiner

*Primary Examiner* — Robert J Michaud
(74) *Attorney, Agent, or Firm* — Winston Hsu

(57) ABSTRACT

A pixel circuit of a display panel includes a light emitting device, a first transistor, a second transistor, a third transistor, a fourth transistor, a fifth transistor, a sixth transistor and a first capacitor. The first transistor includes a drain terminal, a source terminal and a gate terminal. The second transistor is coupled to a data input terminal of the pixel circuit. The third transistor is coupled to the second transistor. The fourth transistor is coupled between the second transistor and the light emitting device. The fifth transistor is coupled between the drain terminal of the first transistor and the gate terminal of the first transistor. The sixth transistor is coupled between the second transistor and the drain terminal of the first transistor. The first capacitor is coupled between the third transistor and the gate terminal of the first transistor.

26 Claims, 23 Drawing Sheets

PIXEL CIRCUIT OF DISPLAY PANEL

BACKGROUND OF THE INVENTION

1. Field of the Invention

The present invention relates to a pixel circuit of a display panel, and more particularly, to the structure of a pixel circuit of a display panel capable of canceling the offset of threshold voltages.

2. Description of the Prior Art

Among those next-generation display technologies, the micro organic light emitting diode (micro-OLED) panel has become important in recent years. Unlike conventional LED or OLED panels with their screens being built on a glass substrate, the screen of a micro-OLED panel is directly mounted to a silicon wafer. The silicon-based implementation can achieve a wide variety of benefits such as small size, light weight, low power consumption, high luminous efficiency, high contrast and high pixel density. With the above advantages, the micro-OLED panel is particularly suitable for augmented reality (AR) and virtual reality (VR) applications.

Similar to the conventional OLED panels, the micro-OLED panels also suffer from uneven brightness between display pixels that is caused by mismatch of driving transistors and/or OLEDs, which is called the Mura effect. People in the industry are making efforts to propose various pixel structures to improve the unevenness problem and solve the Mura effect for the display panels.

SUMMARY OF THE INVENTION

It is therefore an objective of the present invention to provide a novel pixel circuit for an organic light emitting diode (OLED) panel, especially a micro-OLED panel, so as to solve the abovementioned problems.

An embodiment of the present invention discloses a pixel circuit of a display panel. The pixel circuit comprises a light emitting device, a first transistor, a second transistor, a third transistor, a fourth transistor, a fifth transistor, a sixth transistor and a first capacitor. The first transistor comprises a drain terminal, a source terminal and a gate terminal. The second transistor is coupled to a data input terminal of the pixel circuit. The third transistor is coupled to the second transistor. The fourth transistor is coupled between the second transistor and the light emitting device. The fifth transistor is coupled between the drain terminal of the first transistor and the gate terminal of the first transistor. The sixth transistor is coupled between the second transistor and the drain terminal of the first transistor. The first capacitor is coupled between the third transistor and the gate terminal of the first transistor.

Another embodiment of the present invention discloses a pixel circuit of a display panel. The pixel circuit comprises a light emitting device, a first transistor, a second transistor, a third transistor, a fourth transistor, a fifth transistor, a sixth transistor and a first capacitor. The first transistor comprises a drain terminal, a source terminal and a gate terminal. The second transistor is coupled between a data input terminal of the pixel circuit and the drain terminal of the first transistor. The third transistor is coupled to the second transistor and the drain terminal of the first transistor. The fourth transistor is coupled between the drain terminal of the first transistor and the light emitting device. The fifth transistor is coupled between the drain terminal of the first transistor and the gate terminal of the first transistor. The sixth transistor is coupled between the source terminal of the first transistor and a power supply terminal. The first capacitor is coupled between the third transistor and the gate terminal of the first transistor.

Another embodiment of the present invention discloses a pixel circuit of a display panel. The pixel circuit comprises a light emitting device, a first transistor, a second transistor, a third transistor, a fourth transistor, a fifth transistor, a sixth transistor and a first capacitor. The first transistor comprises a drain terminal, a source terminal and a gate terminal. The second transistor is coupled between a data input terminal of the pixel circuit and the drain terminal of the first transistor. The third transistor is coupled between the drain terminal of the first transistor and a reference node. The fourth transistor is coupled between the drain terminal of the first transistor and the light emitting device. The fifth transistor is coupled between the drain terminal of the first transistor and the gate terminal of the first transistor. The sixth transistor is coupled between the reference node and a reference input terminal. The first capacitor is coupled between the reference node and the gate terminal of the first transistor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
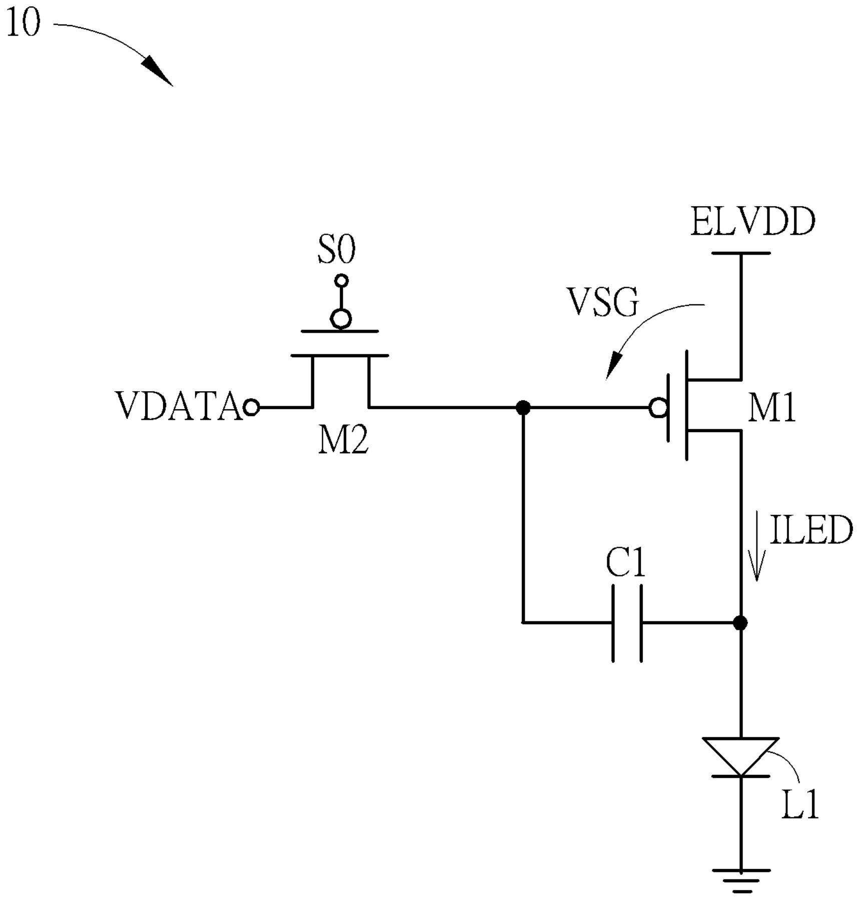
FIG. 1 is a schematic diagram of a pixel circuit of a display panel.

FIG. 1 is a schematic diagram of a pixel circuit 10 of a display panel. The display panel may be an organic light emitting diode (OLED) panel or a micro-OLED panel. The pixel circuit 10 includes transistors M1 and M2, a capacitor C1 and an OLED L1. The transistor M1, which may be a driving transistor, is used to output a driving current ILED to control the OLED L1 to emit light. The transistor M2, which is controlled by a control signal S0, may serve as a switch for receiving an input data VDATA. The input data VDATA that arrives at the gate terminal of the transistor M1 may determine the magnitude of the driving current ILED flowing through the OLED L1, thereby determining the brightness of the OLED L1. The capacitor C1 may be used to store the input data VDATA received at the gate terminal of the transistor M1. The pixel circuit 10 may be operated by receiving a power supply voltage ELVDD from a power supply terminal.

Based on the behavior of the transistor M1, the magnitude of the driving current ILED may be determined according to the correspondence of the driving current ILED and the source-to-gate voltage VSG of the transistor M1. Based on the device mobility of the transistor M1, the relationship of the driving current ILED and the source-to-gate voltage VSG may follow a square law or exponential law. For example, if the pixel circuit 10 is implemented with a thin-film transistor (TFT) process, the mobility is lower and the driving current ILED output by the transistor M1 may be relatively low, and it is more possible that the transistor M1 operates in the saturation region to follow the square law. If the pixel circuit 10 is implemented with a complementary metal-oxide semiconductor (CMOS) process as the silicon-based implementation of the micro-OLED panel, the device mobility is higher than in the TFT process. Therefore, in order to achieve identical current magnitudes, the transistor M1 may operate in the sub-threshold region to follow the exponential law.

No matter whether the transistor M1 operates based on the square law or exponential law, the driving current ILED and the source-to-gate voltage VSG have one-to-one correspondence, so that the driving current ILED may be determined according to the source-to-gate voltage VSG, which is further determined according to the input data VDATA. For the sake of brevity, the formula of square law is described herein, as shown below:

$$ILED=\beta(VSG-VTH)^2; \quad (1)$$

where β represents the gain factor of the transistor M1, and is determined according to the mobility, normalized oxide capacitance, and width/length ratio of the transistor; and VTH is the threshold voltage of the transistor M1. Since the source voltage of the transistor M1 equals the power supply voltage ELVDD and the gate voltage of the transistor M1 equals the input data VDATA when the input data VDATA is received, Equation (1) may be rewritten as:

$$ILED=\beta(ELVDD-VDATA-VTH)^2. \quad (2)$$

Note that the threshold voltage VTH is included in the formula for calculating the driving current ILED. In the display panel, the threshold voltage VTH of different pixels may not be uniform due to process and/or device variations. The mismatch and offset of the threshold voltage VTH may generate uneven brightness between the pixels, thereby generating the Mura effect. Therefore, the present invention provides a novel pixel circuit with appropriate controls to let the Mura effect caused by the offsets of the threshold voltage VTH to be minimized.

Figure 2:
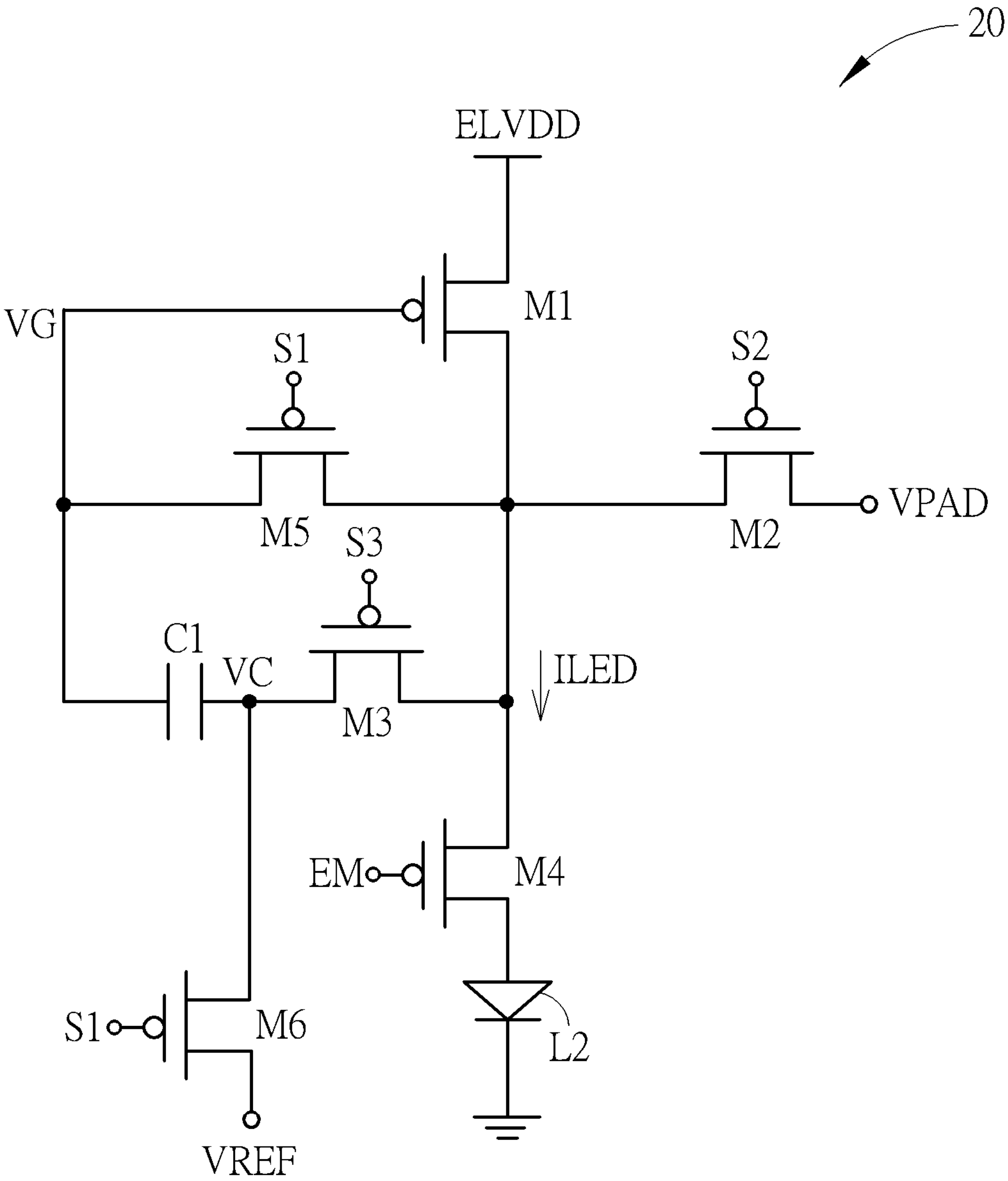
FIG. 2 is a schematic diagram of a pixel circuit of a display panel according to an embodiment of the present invention.

FIG. 2 is a schematic diagram of a pixel circuit 20 of a display panel according to an embodiment of the present invention. The pixel circuit 20 includes transistors M1-M6, a capacitor C1 and a light emitting device L2, to realize a 6T1C structure. The transistor M1, which may serve as a driving transistor similar to that shown in FIG. 1, is used to output a driving current ILED to control the light emitting device L2. More specifically, the transistor M1 may generate a drain current according to a received input data VDATA, and the drain current may serve as the driving current ILED to be output to drive the light emitting device L2 to emit light. The capacitor C1, which may be coupled between the gate terminal of the transistor M1 and a reference node VC, is used to store the input data VDATA to be forwarded to the gate terminal of the transistor M1, as similar to the capacitor C1 of the pixel circuit 10. The capacitor C1 may also be used to store the information of the threshold voltage VTH generated at the gate terminal of the transistor M1.

The transistors M2-M6, which may serve as control switches for controlling the operations of the transistor M1 and the light emitting device L2, may be deployed and controlled appropriately to cancel the effect of the threshold voltage VTH of the transistor M1 on the driving current ILED. In this embodiment, the transistors M2-M6 may receive control signals S1, S2, S3 and EM to realize the cancellation of the threshold voltage VTH in several phases.

In detail, the transistor M2 is coupled between a data input terminal VPAD of the pixel circuit 20 and the drain terminal of the transistor M1, to serve as a switch for controlling the reception of display data. In detail, a first terminal of the transistor M2 may be coupled to the data input terminal VPAD to receive the input data VDATA, a second terminal of the transistor M2 may be coupled to the drain terminal of the transistor M1, and the gate terminal of the transistor M2 may receive the control signal S2. The transistor M2 may be used to control the pixel circuit 20 to receive the input data VDATA.

The transistor M3 is coupled between the drain terminal of the transistor M1 and the reference node VC, to serve as a switch for forwarding the input data VDATA. In detail, a first terminal of the transistor M3 may be coupled to the drain terminal of the transistor M1, a second terminal of the transistor M3 may be coupled to the reference node VC and the capacitor C1, and the gate terminal of the transistor M3 may receive the control signal S3. The transistor M3 may be used to forward the input data VDATA to the capacitor C1, allowing the input data VDATA to be coupled to the gate terminal of the transistor M1 through the capacitor C1.

The transistor M4 is coupled between the drain terminal of the transistor M1 and the light emitting device L2, to serve as a switch for controlling light emission of the pixel circuit 20. In detail, a first terminal of the transistor M4 may be coupled to the drain terminal of the transistor M1, a second terminal of the transistor M4 may be coupled to the light emitting device L2, and the gate terminal of the transistor M4 may receive the emission control signal EM. The transistor M4 may be used to control the driving current ILED generated by the transistor M1 to flow to the light emitting device L2.

The transistor M5 is coupled between the drain terminal of the transistor M1 and the gate terminal of the transistor M1, to serve as a switch for initializing. In detail, a first terminal of the transistor M5 may be coupled to the drain terminal of the transistor M1, a second terminal of the transistor M5 may be coupled to the gate terminal of the transistor M1, and the gate terminal of the transistor M5 may receive the control signal S1. The transistor M5 may be used to conduct the gate terminal and the drain terminal of the transistor M1 in a reset phase to initialize the gate voltage of the transistor M1.

The transistor M6 is coupled between the reference node VC and a reference input terminal, to serve as a switch for receiving a reference voltage VREF. In detail, a first terminal of the transistor M6 may be coupled to the reference node VC, a second terminal of the transistor M6 may be coupled to the reference input terminal, and the gate terminal of the transistor M6 may receive the control signal S1. The transistor M6 may be used to control the pixel circuit 20 to receive the reference voltage VREF.

The light emitting device L2 is coupled between the transistor M4 and the ground terminal. The light emitting device L2, which may emit light when driven by the driving current ILED received from the transistor M1, may be any device capable of emitting light by receiving currents, such as an OLED.

Figure 3:
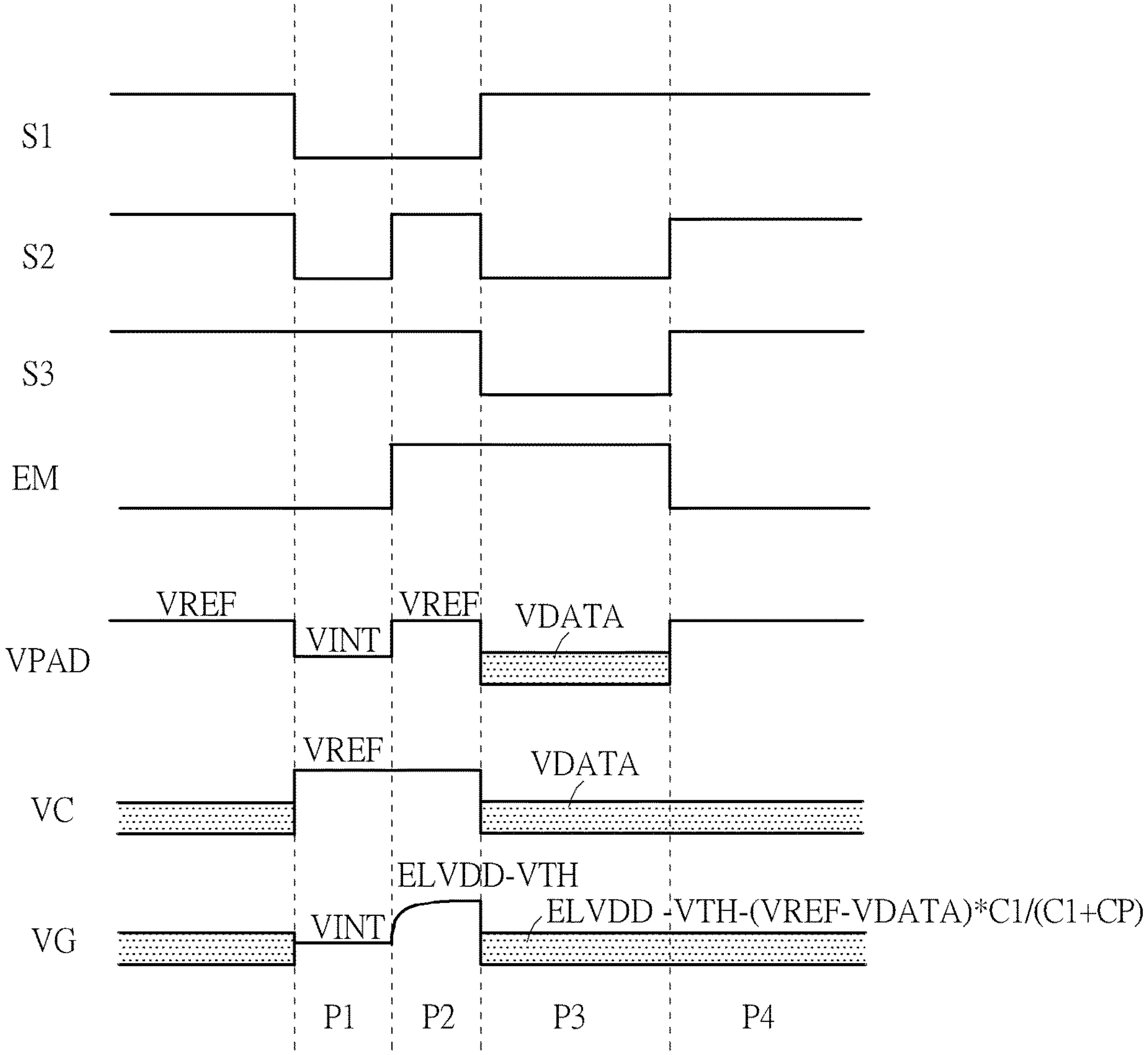
FIG. 3 is a waveform diagram of related signals and voltages of the pixel circuit shown in FIG. 2.

The operations of the pixel circuit 20 include several phases. FIG. 3 is a waveform diagram of related signals and voltages of the pixel circuit 20, where the waveforms of the control signals S1-S3, the emission control signal EM, the voltage of the data input terminal VPAD, the voltage at the reference node VC, and the gate voltage VG of the transistor M1 are shown. Note that in the pixel circuit 20, the transistors M1-M6 are all PMOS transistors, and thus the signals in low level may turn on the corresponding transistors and in high level may turn off the corresponding transistors. FIG. 3 shows that the operations of the pixel circuit 20 have 4 phases P1-P4, which are illustrated in FIGS. 4A-4D, respectively. In addition to the 6T1C pixel structure, FIGS. 4A-4D further illustrate a parasitic capacitor CP coupled to the gate terminal of the transistor M1. The parasitic capacitor CP may generally refer to the combination of the parasitic capacitors seen at the gate terminal of the transistor M1, such as gate-to-source capacitor and the gate-to-drain capacitor.

Figure 4A:
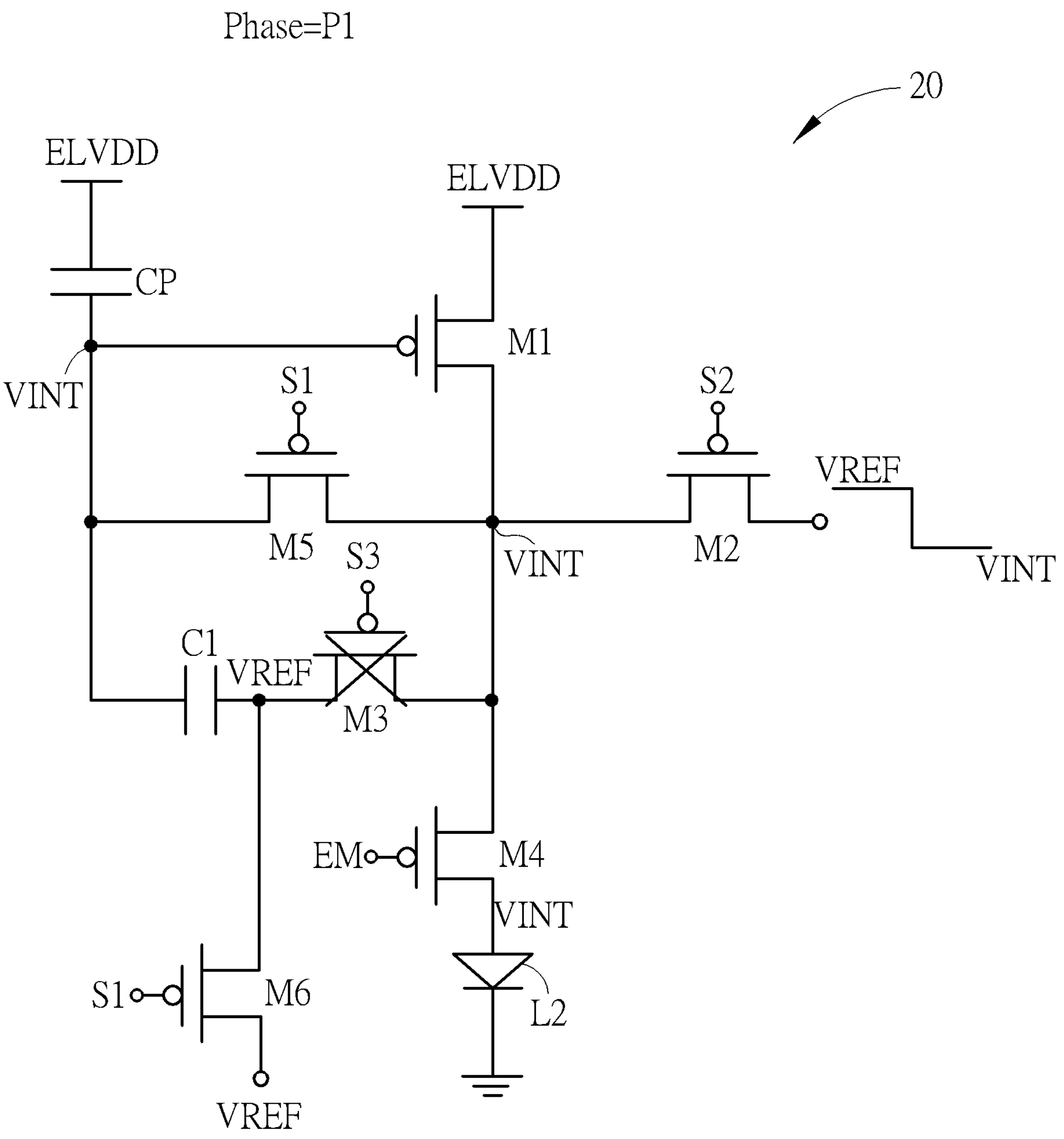
FIGS. 4A-4D illustrate the operations of the pixel circuit in several phases.

Referring to FIG. 4A along with FIG. 3, the phase P1 may be regarded as a reset phase (or called initial phase or pre-charge phase), where the transistors M2, M4, M5 and M6 are turned on and the transistor M3 is turned off. In the phase P1, the pixel circuit 20 receives an initial voltage VINT from the data input terminal VPAD. Since the transistors M2 and M5 are conducted, the gate and drain terminals of the transistor M1 are initialized or reset to the initial voltage VINT. The initial voltage VINT should be low enough to slightly turn on the transistor M1 so that the threshold voltage VTH can be successfully written into the gate terminal of the transistor M1 in the next phase. In addition, since the transistor M4 is conducted, the anode of the light emitting device L2 is also initialized or reset to the initial voltage VINT. As for the light emitting device L2, the initial voltage VINT should be low enough to prevent the light emitting device L2 from emitting light in this phase. Further, since the transistor M6 is turned on, the voltage of the reference node VC may reach the reference voltage VREF. In an embodiment, the voltage at the data input terminal VPAD may be converted from the reference voltage VREF in the previous operation cycle to the initial voltage VINT in the phase P1 of the present operation cycle, as shown in FIG. 4A.

Figure 4B:
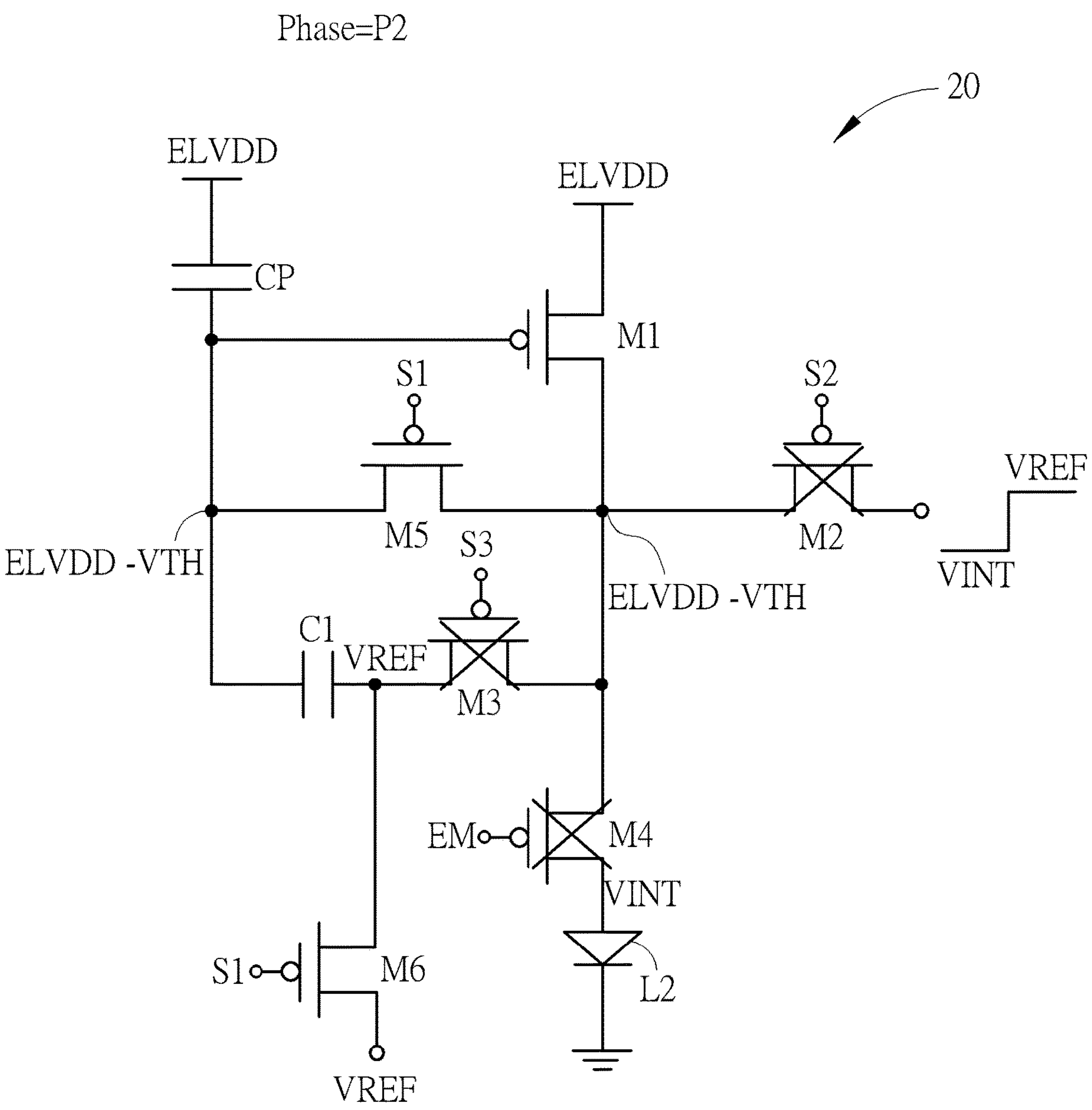

Referring to FIG. 4B along with FIG. 3, in the phase P2, the transistors M2 and M4 are turned off, the transistors M5 and M6 keep on, and the transistor M3 keeps off. The phase P2 is used for storing the information of the threshold voltage VTH. More specifically, the source terminal of the transistor M1 receives the power supply voltage ELVDD, causing that the gate voltage of the transistor M1 rises to ELVDD-VTH, and the drain voltage of the transistor M1 also reaches ELVDD-VTH with the conducted transistor M5. The charges corresponding to the gate voltage ELVDD-VTH are thereby stored in the capacitors C1 and CP. At this moment, the reference node VC keeps at the reference voltage VREF with the conducted transistor M6. The voltage at the data input terminal VPAD may return to the reference voltage VREF to be ready for receiving the input data VDATA in the next phase.

Figure 4C:
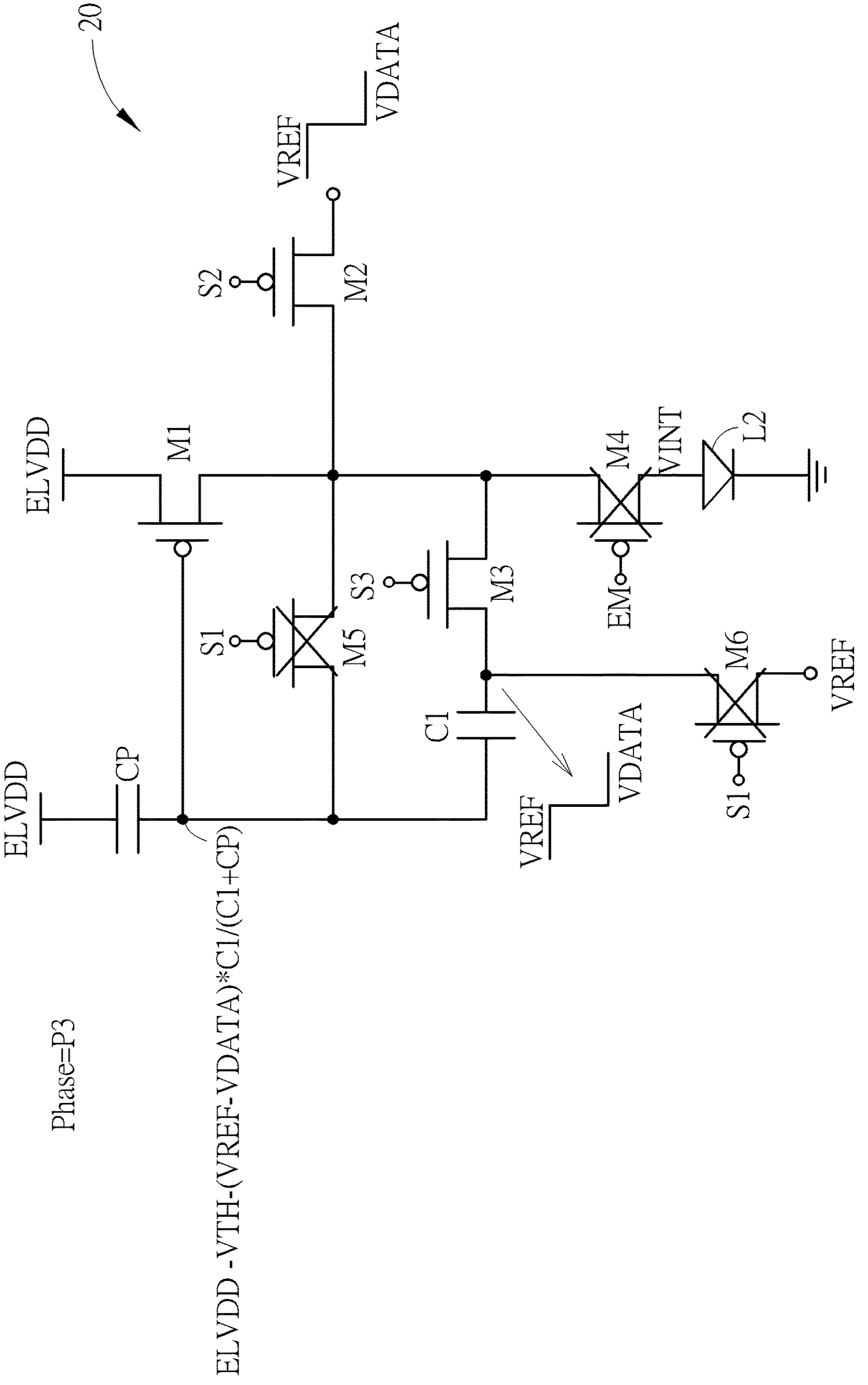

Referring to FIG. 4C along with FIG. 3, the phase P3 may be regarded as a scan phase, where the transistors M2 and M3 are turned on, the transistors M5 and M6 are turned off, and the transistor M4 keeps off. In this phase, the input data VDATA is input from the data input terminal VPAD. With the conducted transistors M2 and M3, the voltage at the reference node VC may decrease to the input data VDATA, which may be written into the gate terminal of the transistor M1 through the capacitor C1. More specifically, the voltage at the reference node VC changes from the reference voltage VREF to the input data VDATA, and this voltage variation may be coupled through the capacitor C1 to the gate terminal of the transistor M1. With the voltage division of the capacitors C1 and CP, the gate voltage VG will be equal to:

$$VG = ELVDD - VTH - (VREF - VDATA) \times \frac{C1}{C1 + CP}. \tag{3}$$

In this phase, the gate voltage VG may include the information of the input data VDATA and the threshold voltage VTH.

Note that the voltage at the data input terminal VPAD is the reference voltage VREF at the end of the phase P2 (i.e., before the input data VDATA is received). Therefore, from the phase P2 to the phase P3, both the data input terminal VPAD and the reference node VC change from the reference voltage VREF to the input data VDATA. This allows the voltage variation in the pixel circuit 20 and the corresponding data line to be more identical, so that the unwanted voltage ripple at the reference node VC may be minimized. Since the transistor M2 is off in the phase P2, in another embodiment, the voltage at the data input terminal VPAD may be in any appropriate level other than the reference voltage VREF in the phase P2 without significantly influencing the behavior of the pixel circuit 20.

Figure 4D:
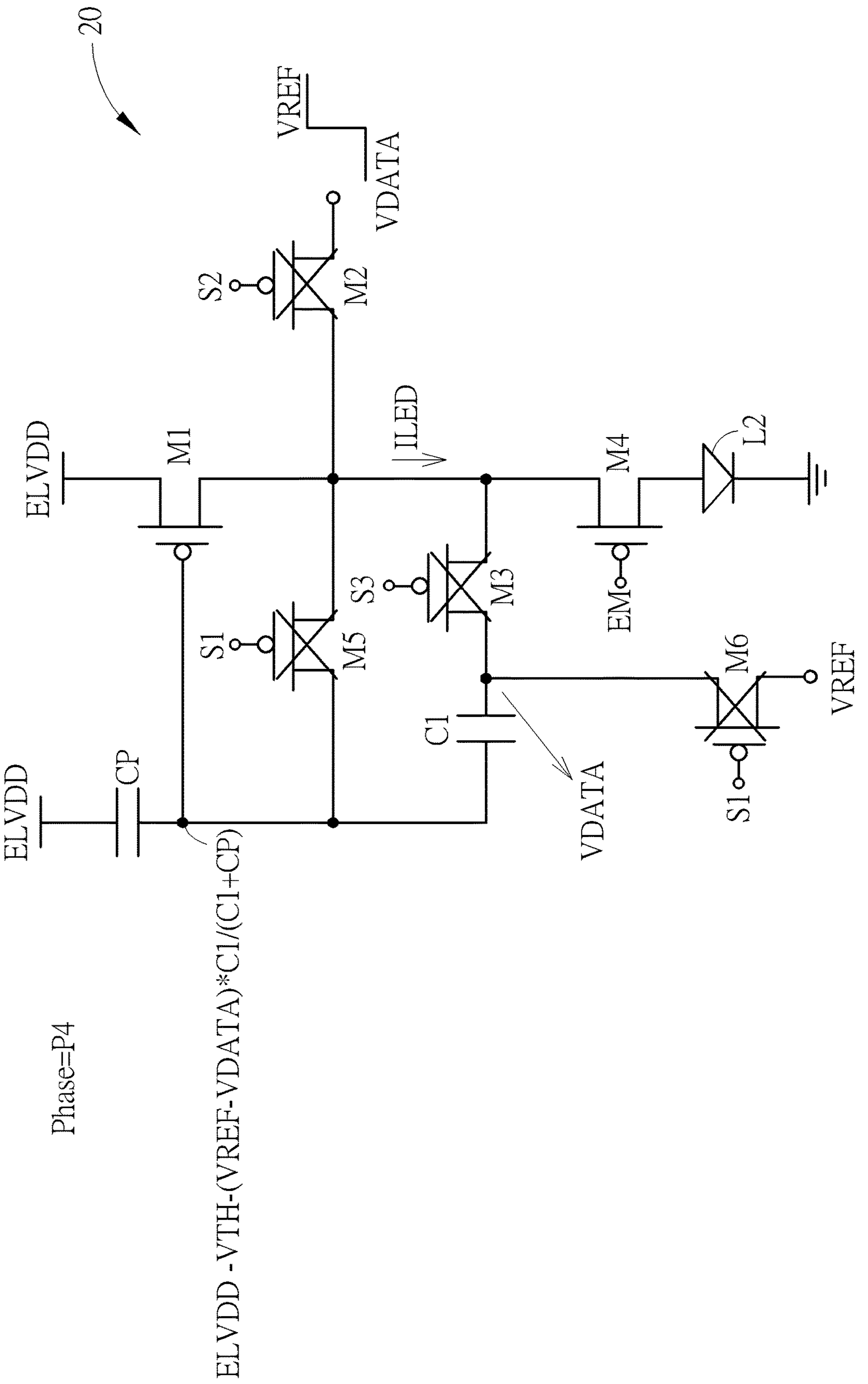

Referring to FIG. 4D along with FIG. 3, the phase P4 may be regarded as an emission phase, where the transistor M4 is turned on, and other transistors M2, M3, M5 and M6 are all off. The conducted transistor M4 allows the driving current ILED to be forwarded to the light emitting device L2, so that the light emitting device L2 may emit light. Since the gate voltage VG is stored in the capacitors C1 and CP, the driving current ILED may keep at its target level during the emission time.

As mentioned above, the brightness emitted by the light emitting device L2 may be determined according to the magnitude of the driving current ILED, which is further determined according to the source-to-gate voltage VSG of the transistor M1. In an embodiment, if the pixel circuit 20 is implemented with the TFT process to be deployed on the panel, the operations of the transistor M1 may follow the square law, and the driving current ILED may be calculated as follows:

$$\begin{aligned} ILED &= \beta(VSG - VTH)^2 \\ &= \beta\left(ELVDD - \left(ELVDD - VTH - (VREF - VDATA)\times\frac{C1}{C1+CP}\right) - VTH\right)^2 \\ &= \beta\left((VREF - VDATA)\times\frac{C1}{C1+CP}\right)^2 \\ &\approx \beta(VREF - VDATA)^2; \end{aligned} \quad (4)$$

where β represents the gain factor of the transistor M1 and equals:

$$\beta = \frac{\mu_n \times C_{OX}}{2} \times \frac{W}{L};$$

where $\mu_n$ is the mobility of the transistor M1, $C_{OX}$ is the normalized oxide capacitance of the transistor M1, and W/L is the width/length ratio of the transistor M1. Note that Equation (4) is obtained by assuming that the parasitic capacitor CP is extremely small and may be ignored.

As can be seen in Equation (4), the value of the driving current ILED only includes a signal dependent term consisting of the input data VDATA, and will not depend on the threshold voltage VTH, which means that the offset of the threshold voltage VTH between pixels will not influence the current magnitude and the brightness of the light emitting device L2. The parameter β may not generate a significant mismatch or offset that needs to be canceled. As a result, the problem of brightness non-uniformity may be solved.

In another embodiment, the pixel circuit 20 may be implemented with a complementary metal-oxide semiconductor (CMOS) process as the silicon-based implementation in an integrated circuit (IC), such as in a micro-OLED panel. Therefore, the device mobility of the transistors is higher than that in the TFT process, and thus the transistor M1 of the pixel circuit 20 may operate in the sub-threshold region, which follows the formula as:

$$\begin{aligned} ILED &= I_{D0}\times e^{\frac{(VSG - VTH)}{n\times V_t}} \\ &= I_{D0}\times e^{\frac{(ELVDD - (ELVDD - VTH - (VREF - VDATA)\times C1/(C1+CP)) - VTH)}{n\times V_t}} \\ &= I_{D0}\times e^{\frac{((VREF - VDATA)\times C1/(C1+CP))}{n\times V_t}} \\ &\approx I_{D0}\times e^{\frac{(VREF - VDATA)}{n\times V_t}}; \end{aligned} \quad (5)$$

and $$I_{D0} = \mu_n C_{OX}(n-1)V_t^2 \times \frac{W}{L}; \quad (6)$$

where $\mu_n$ is the mobility of the transistor M1, $C_{OX}$ is the normalized oxide capacitance of the transistor M1, W/L is the width/length ratio of the transistor M1, $V_t$ is the thermal voltage, and n is equal to $(C_{OX}+C_{depl})/C_{OX}\sim1.5$, where $C_{depl}$ is the depletion capacitance of the transistor M1. Note that the effects of the threshold voltage VTH may also be minimized or canceled under the exponential law.

Figure 5:
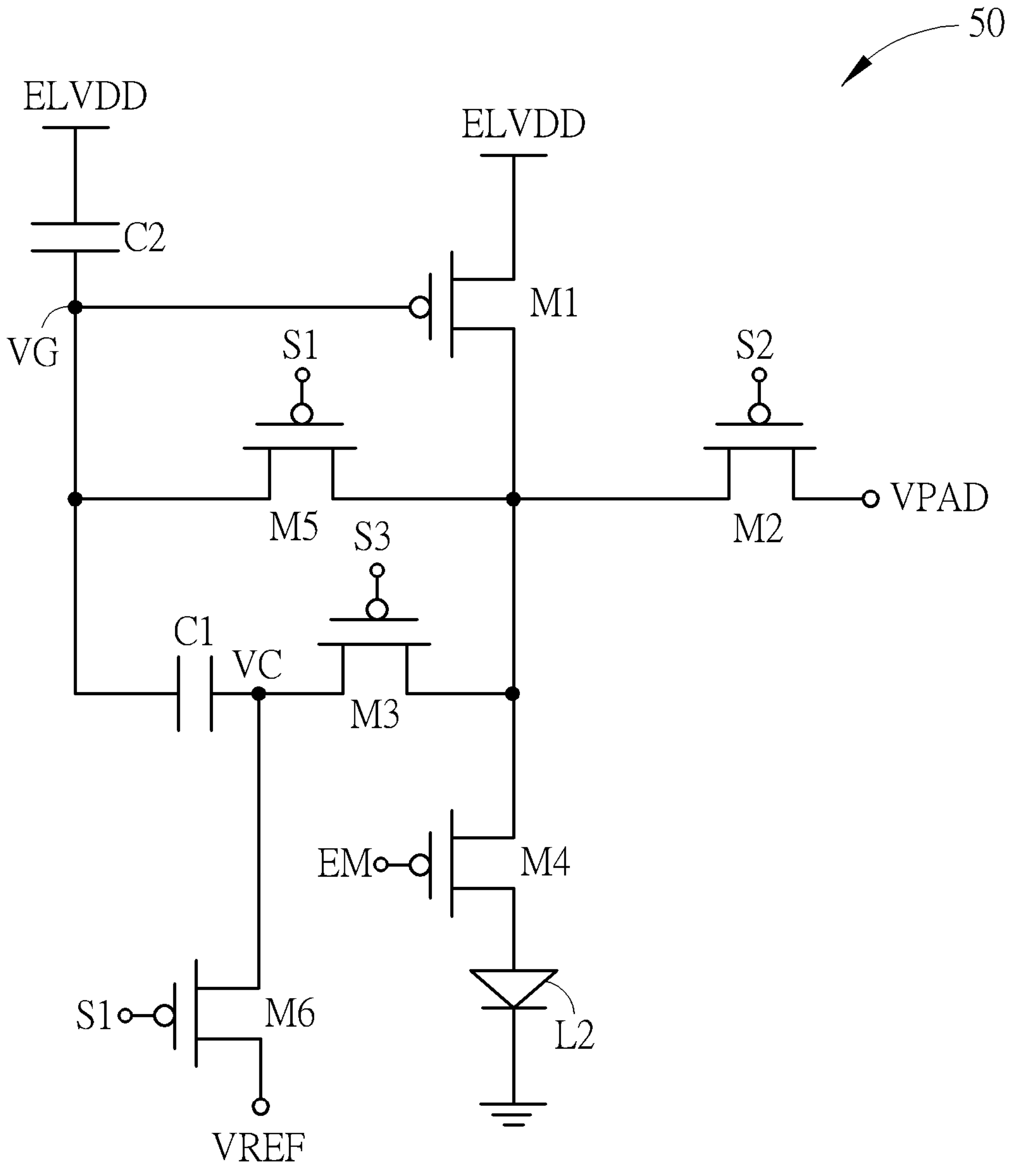
FIG. 5 is a schematic diagram of a pixel circuit of a display panel according to an embodiment of the present invention.

FIG. 5 is a schematic diagram of a pixel circuit 50 of a display panel according to an embodiment of the present invention. The structure of the pixel circuit 50 is similar to the structure of the pixel circuit 20, so signals and elements having similar functions are denoted by the same symbols. The difference between the pixel circuit 50 and the pixel circuit 20 is that, the pixel circuit 50 further includes a capacitor C2 coupled to the gate terminal of the transistor M1. In this embodiment, the capacitor C2 is coupled between the gate terminal of the transistor M1 and the power supply terminal for receiving ELVDD.

Figure 6:
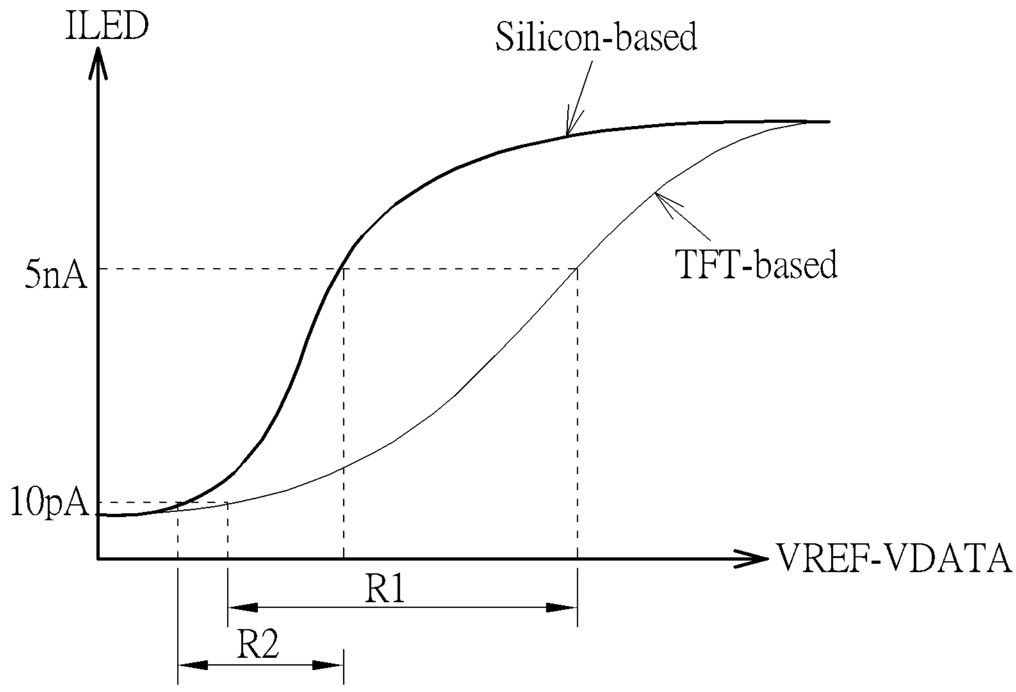
FIG. 6 is a waveform diagram of the relation of the driving current and the input data in the silicon-based implementation and the TFT-based implementation.

The structure of the pixel circuit 50 having the capacitor C2 is more suitable for the display pixels implemented in the IC, i.e., the silicon-based implementation. FIG. 6 is a waveform diagram of the relation of the driving current ILED and the input data VDATA in the silicon-based implementation and the TFT-based implementation. As shown in FIG. 6, the x-coordinate is VREF-VDATA, which may represent the variation of the input data VDATA since the reference voltage VREF is fixed. Suppose that the pixel structure applies a 6T1C structure such as the pixel circuit 20. The light emitting device L2 such as an OLED usually emits light as being driven by the driving current ILED between 10 picoampere (pA) and 5 nanoampere (nA). In the TFT-based implementation, the driving current ILED may follow the square law, and thus a larger voltage swing range R1 such as 1 V-2 V will achieve the operation range of the driving current ILED, i.e., from 10 pA to 5 nA. In the silicon-based implementation having the same 6T1C circuit structure, the driving current ILED may follow the exponential law, and thus the same operation range of the driving current ILED may be achieved by a smaller voltage swing range R2 such as 200 mV-300 mV. This is because the device mobility of the transistors under the silicon-based implementation is higher, which means that the voltage swing range required for generating the same brightness variation becomes smaller. The smaller voltage swing range requires a much finer resolution to achieve the same gamma scale, which is accompanied by higher design difficulty and more circuit costs.

A 6T2C pixel structure with an additional capacitor such as the capacitor C2 applied in the pixel circuit 50 may mitigate or solve this problem. When the capacitor C2 is included under the silicon-based implementation, the curve of ILED versus VREF-VDATA will become closer to their relationship under the TFT-based implementation, which increases the voltage swing range for achieving the same operation range of the driving current ILED. The increased voltage swing range facilitates the settings of the gamma curve, so as to improve the design flexibility, reduce the circuit costs, and also realize a better visual effect.

The detailed operations and timings of the pixel circuit 50 is similar to those of the pixel circuit 20, i.e., the transistors are controlled in 4 phases for canceling the effects of the threshold voltage VTH, except that the swing range of the input data VDATA is extended by using the capacitor C2. In addition, the capacitor C2 may further help maintain the gate voltage VG of the transistor M1 at its target level. The related waveforms and operations of the pixel circuit 50 may be referred to FIGS. 3 and 4A-4D, and will not be detailed herein.

In addition, with the deployment of the capacitor C2, the formula of calculating the driving current ILED in the TFT-based implementation following the square law may be modified to be:

$$ILED=\beta\left((VREF-VDATA)\times\frac{C1}{C1+C2}\right)^2; \tag{7}$$

or in the silicon-based implementation following the exponential law may be modified to be:

$$ILED=I_{D0}\times e^{\frac{((VREF-VDATA)\times C1/(C1+C2))}{n\times V_t}}. \tag{8}$$

Note that Equations (7) and (8) are similar to Equations (4) and (5) except that Equations (7) and (8) include an additional factor C1/(C1+C2). This factor divides the value of VDATA in the calculation of ILED, thereby increasing the voltage swing range of the input data VDATA for generating the same range of the driving current ILED.

Figure 7:
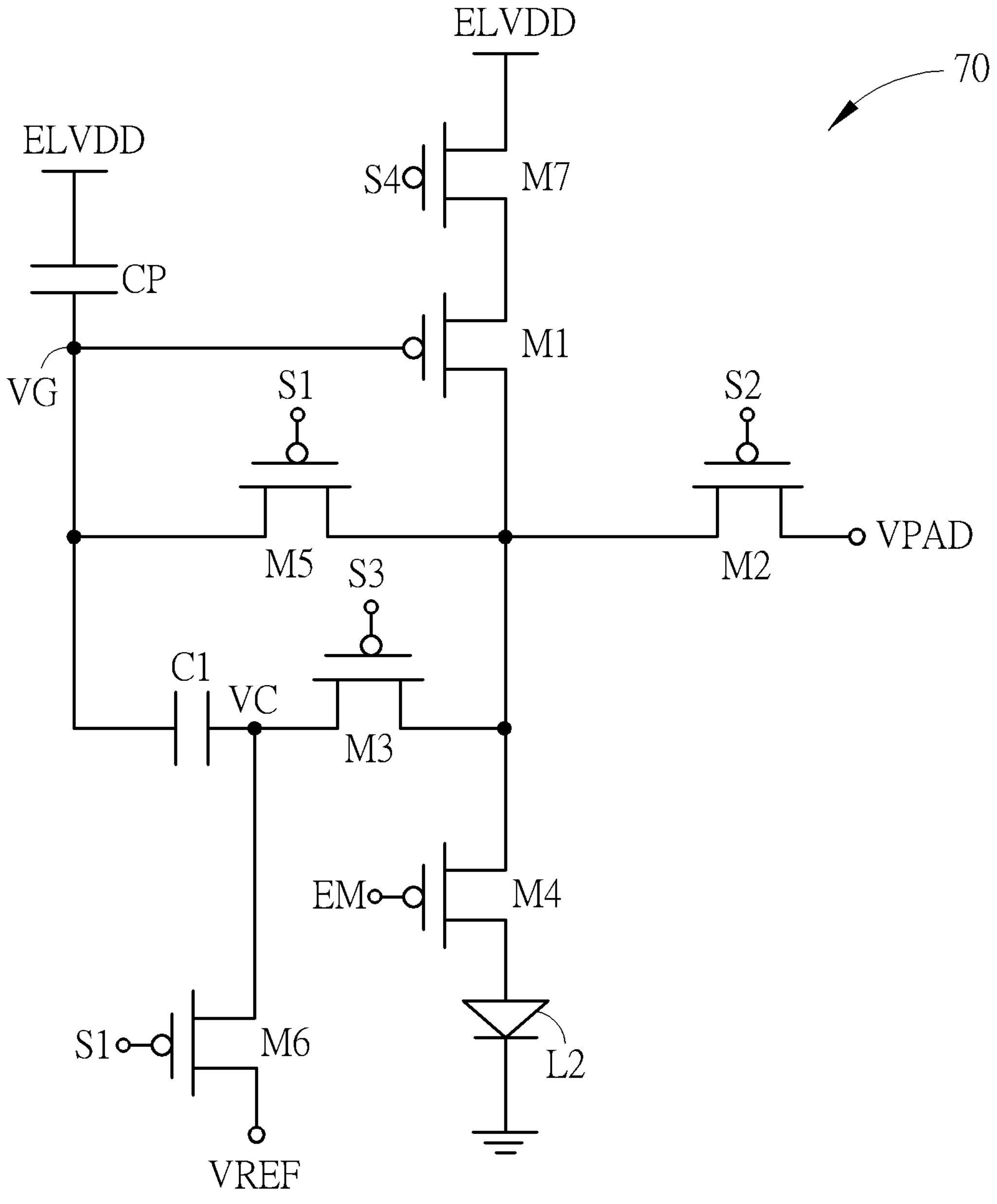
FIG. 7 is a schematic diagram of a pixel circuit of a display panel according to an embodiment of the present invention.

FIG. 7 is a schematic diagram of a pixel circuit 70 of a display panel according to an embodiment of the present invention. The structure of the pixel circuit 70 is similar to the structure of the pixel circuit 20, so signals and elements having similar functions are denoted by the same symbols. The difference between the pixel circuit 70 and the pixel circuit 20 is that, the pixel circuit 70 further includes an additional transistor M7, which is coupled between the source terminal of the transistor M1 and the power supply terminal that receives the power supply voltage ELVDD.

The transistor M7 is used to cut off a current path from the power supply terminal, to prevent unnecessary current leakage. Referring back to FIG. 4C, in the phase P3 where the input data VDATA is received, the transistor M2 operates as a turn-on switch, and the transistor M1 is previously initialized to a slightly turn-on state. In general, the power supply voltage ELVDD may equal 8V and the input data VDATA may range between 4V and 7V, such that the turn-on transistors M1 and M2 may form a conducting path to forward a leakage current. In such a situation, the on-resistance of the transistors M1 and M2 will cause a voltage division on the input data VDATA, such that the data voltage actually input to the reference node VC may slightly deviate from the accurate input data VDATA. The deviation of the data voltage may cause an error on the driving current ILED and the corresponding brightness of this pixel circuit.

Therefore, in order to prevent the deviation of the data voltage, the pixel circuit 70 may include the transistor M7, which is turned off in the phase P3 (i.e., scan phase) to cut off the leakage current path, so as to avoid the voltage division effects on the input data VDATA; hence, the data voltage actually input to the reference node VC will be exactly identical to the input data VDATA received at the data input terminal VPAD, so as to improve the accuracy of brightness.

Figure 8:
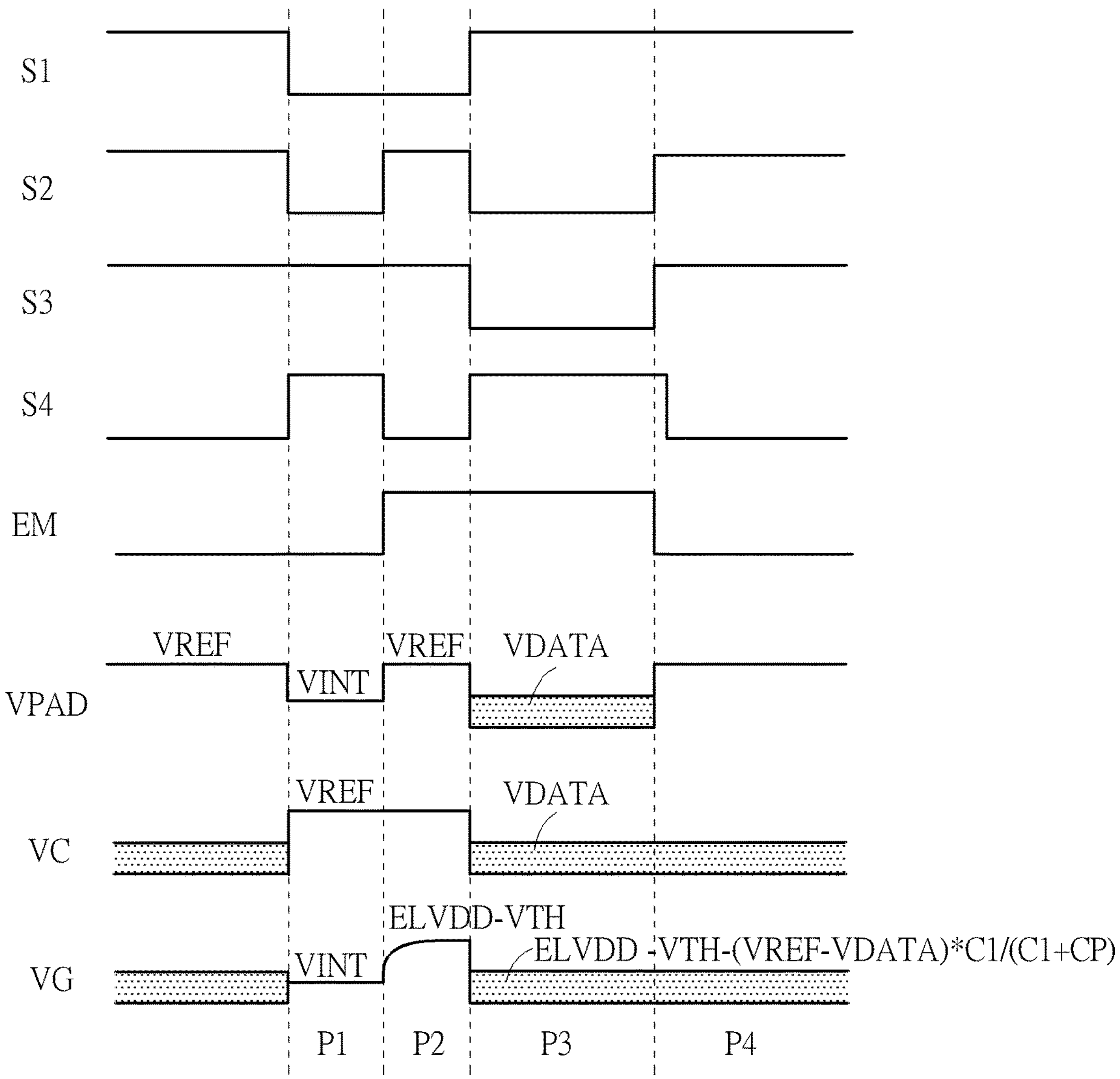
FIG. 8 is a waveform diagram of related signals and voltages of the pixel circuit shown in FIG. 7.
Figure 9:
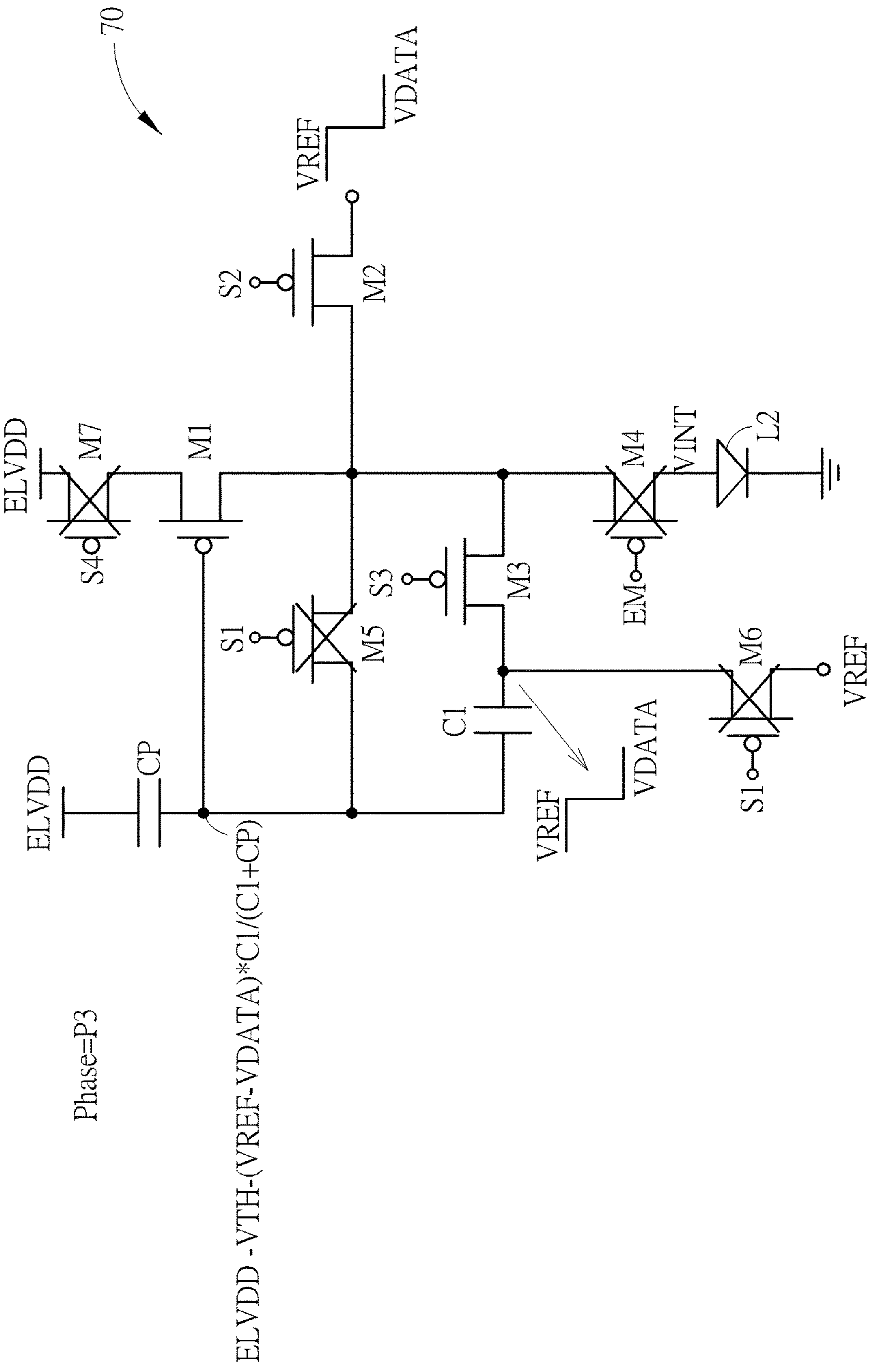
FIG. 9 illustrates the operations of the pixel circuit in a phase.

FIG. 8 is a waveform diagram of related signals and voltages of the pixel circuit 70, where the waveforms of the control signals S1-S4, the emission control signal EM, the voltage of the data input terminal VPAD, the voltage at the reference node VC, and the gate voltage VG of the transistor M1 are shown. FIG. 9 illustrates the operations of the pixel circuit 70 in the phase P3. Referring to FIG. 8 and FIG. 9, the transistor M7, which is controlled by an additional control signal S4, may be turned on in the phases P2 and P4 and turned off in the phases P1 and P3. More specifically, the transistor M7 should be turned off in the phase P3, to cut off the leakage current during data reception. In addition, the transistor M7 should be turned on in the phase P4, to enable the output of the driving current ILED to the light emitting device L2.

The operations of other circuit elements in the pixel circuit 70 and the operations of the pixel circuit 70 in other phases are similar to those of the pixel circuit 20 as described above, and will not be repeated herein. Further, the structure of the pixel circuit 70 may further be deployed with an additional capacitor coupled to the gate terminal of the transistor M1 as similar to that shown in FIG. 5, to extend the swing range of the input data VDATA.

As shown in FIG. 7, the pixel circuit 70 is a 7T1C structure, which includes one additional transistor and thus has higher costs. In an embodiment, the transistor for preventing current leakage may be coupled between the drain terminal of the transistor M1 (for driving the light emitting device L2) and the transistor M2 (for receiving the input data VDATA), and the reference input terminal for receiving the reference voltage VREF may be integrated with the data input terminal VPAD. In this manner, the pixel circuit may be simplified to a 6T1C structure, and the current leakage problem in the pixel circuit 20 may still be solved.

Figure 10:
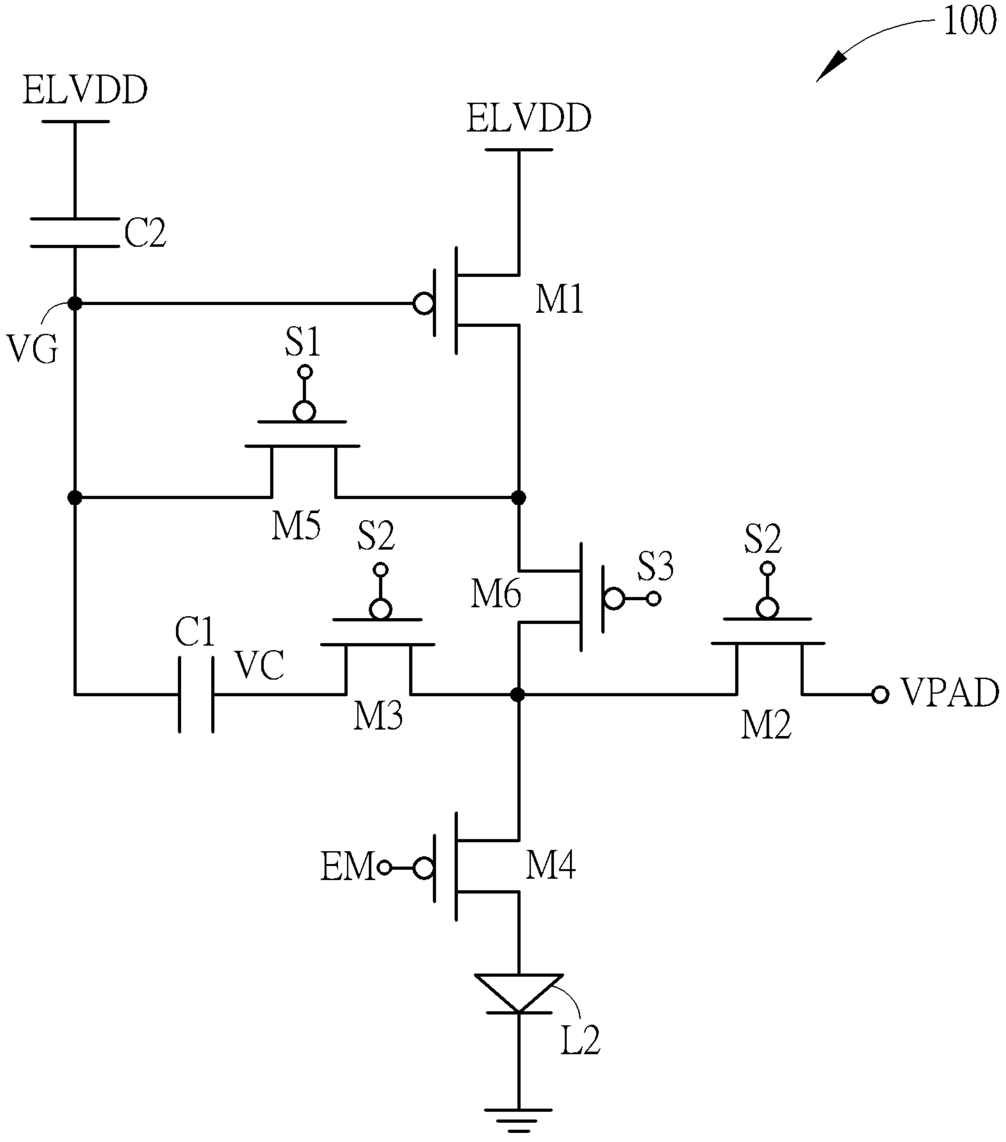
FIG. 10 is a schematic diagram of a pixel circuit of a display panel according to an embodiment of the present invention.

FIG. 10 is a schematic diagram of a pixel circuit 100 of a display panel according to an embodiment of the present invention. The pixel circuit 100 includes transistors M1-M6, a capacitor C1 and a light emitting device L2. A capacitor C2 may or may not be included in the pixel circuit 100 to generate an appropriate input voltage swing range under the silicon-based or TFT-based implementation. In the pixel circuit 100, the implementations of the transistors M1-M5, the capacitor C1 and the light emitting device L2 are similar to those of the pixel circuit 20 shown in FIG. 2, and thus not repeated herein. The pixel circuit 100 may further include an additional transistor M6 coupled between the transistor M2 and the drain terminal of the transistor M1. In this embodiment, the transistor M5 is operated by receiving the control signal S1, the transistors M2 and M3 are operated by receiving the control signal S2, the transistor M6 is operated by receiving the control signal S3, and the transistor M4 is operated by receiving the emission control signal EM.

Note that in the pixel circuit 20 as shown in FIG. 2, the transistor M6 is coupled to a reference input terminal other than the data input terminal VPAD, for receiving the reference voltage. In contrast, in the pixel circuit 100 as shown in FIG. 10, there is no additional reference input terminal, and the reference voltage VREF is only received from the data input terminal VPAD that forwards the input data VDATA. Therefore, the transistor M6 is coupled between the transistor M2 and the drain terminal of the transistor M1, to serve as a switch for forwarding the reference voltage VREF when the reference voltage VREF is received, and for cutting off the current leakage path when the input data VDATA is received. In detail, a first terminal of the transistor M6 may be coupled to the drain terminal of the transistor M1, and a second terminal of the transistor M6 may be coupled to the transistor M2, and the gate terminal of the transistor M6 may receive the control signal S3.

Figure 11:
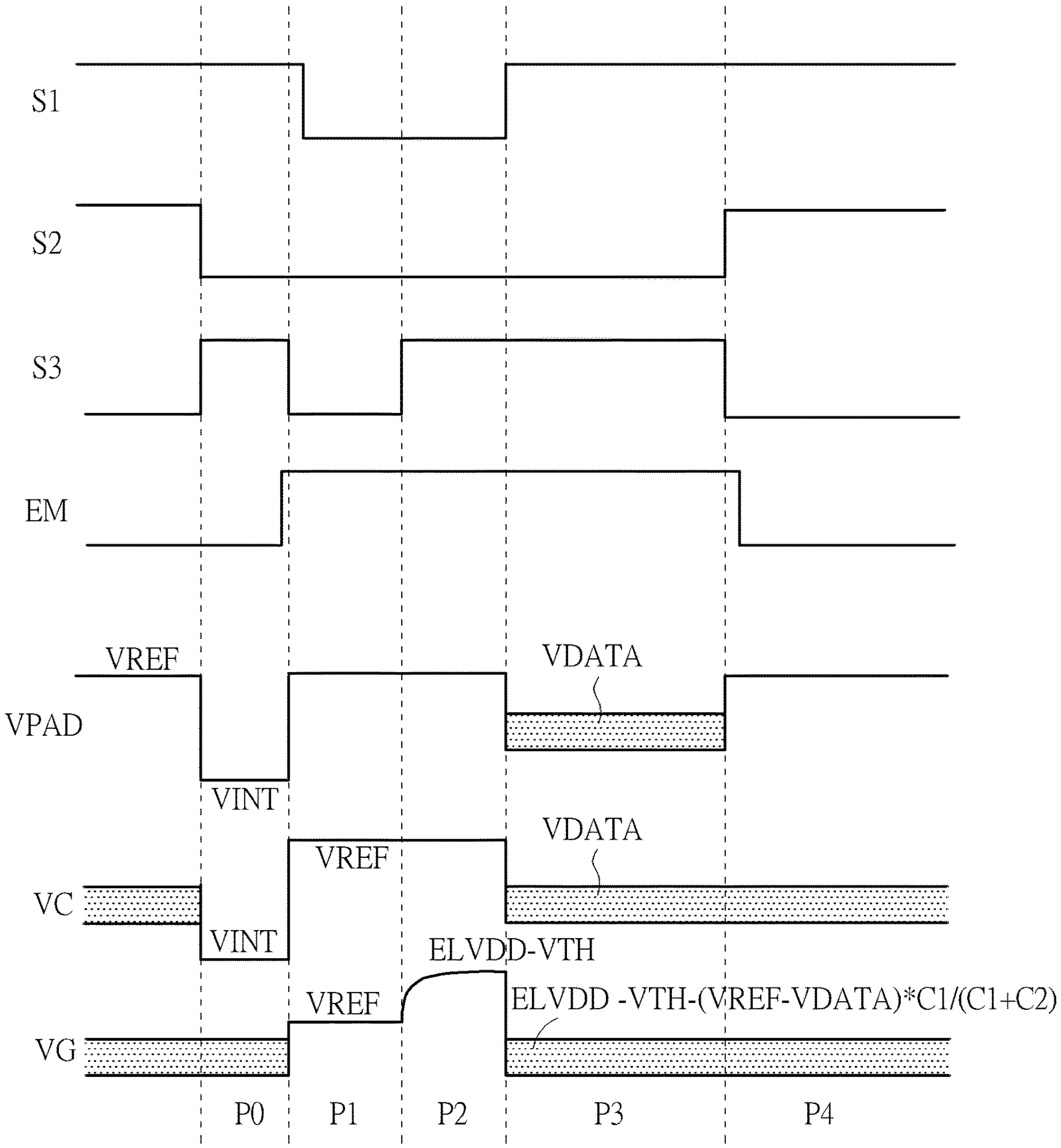
FIG. 11 is a waveform diagram of related signals and voltages of the pixel circuit shown in FIG. 10.

FIG. 11 is a waveform diagram of related signals and voltages of the pixel circuit 100, where the waveforms of the control signals S1-S3, the emission control signal EM, the voltage of the data input terminal VPAD, the voltage at the reference node VC, and the gate voltage VG of the transistor M1 are shown. Similarly, in the pixel circuit 100, the transistors M1-M6 are all PMOS transistors, and thus the signals in low level may turn on the corresponding transistors and in high level may turn off the corresponding transistors. FIG. 11 shows that the operations of the pixel circuit 100 have 5 phases P0-P4, which are illustrated in FIGS. 12A-12E, respectively.

Figure 12A:
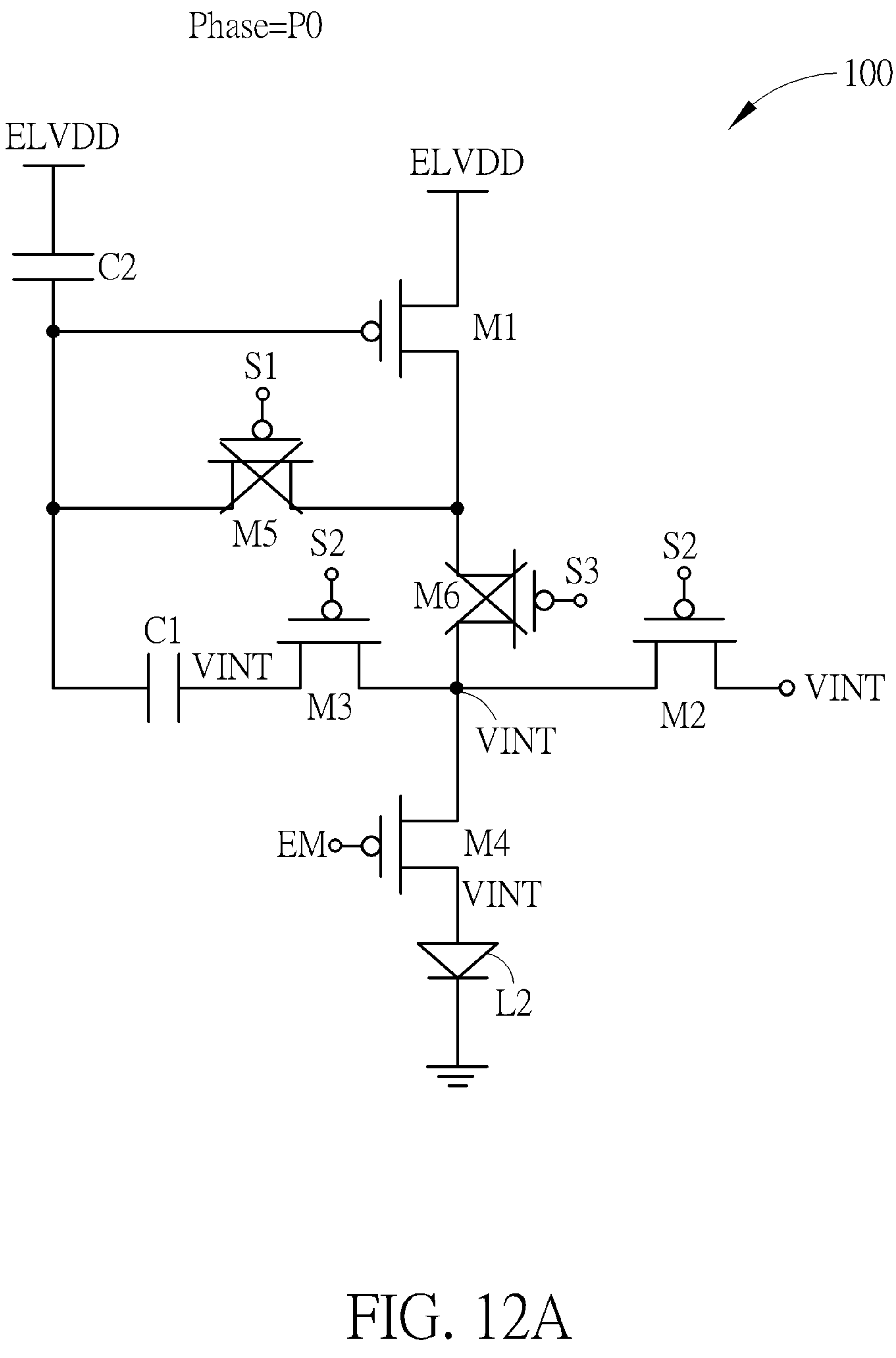
FIGS. 12A-12E illustrate the operations of the pixel circuit in several phases.

The phases P0 and P1 may be regarded as two sub-phases of a reset phase. Referring to FIG. 12A along with FIG. 11, in the phase P0, the transistors M2, M3 and M4 are turned on, and the transistors M5 and M6 are turned off. The pixel circuit 100 receives an initial voltage VINT from the data input terminal VPAD. Since the transistors M2 and M4 are conducted, the anode of the light emitting device L2 is initialized or reset to the initial voltage VINT.

Figure 12B:
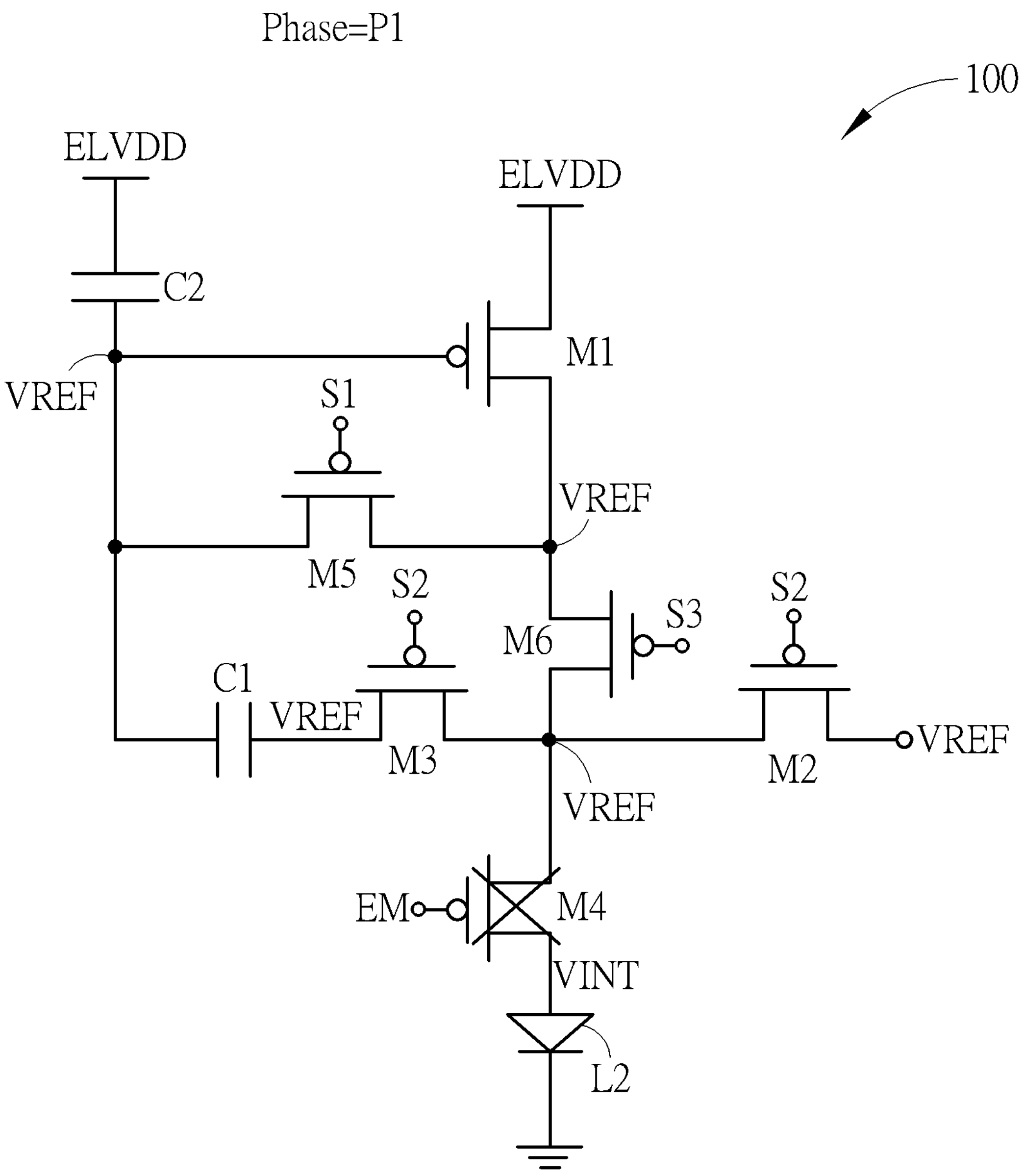

Referring to FIG. 12B along with FIG. 11, in the phase P1, the transistors M5 and M6 are turned on, the transistors M2 and M3 keep on, and the transistor M4 is turned off. The pixel circuit 100 receives a reference voltage VREF from the data input terminal VPAD. Since the transistors M2, M5 and M6 are conducted, the gate and drain terminals of the transistor M1 are initialized or reset to the reference voltage VREF.

Preferably, the initial voltage VINT for initializing the light emitting device L2 may be smaller than the reference voltage VREF for initializing the transistor M1. The difference of the initial voltage VINT and the reference voltage VREF allows both the light emitting device 12 and the transistor M1 to be reset to their appropriate voltage values. In such a situation, the light emitting device L2 may be reset to a low enough voltage to be prevented from emitting unwanted light, while the transistor M1 may not be reset to an excessively low voltage which turns on the transistor M1 to generate a significant leakage current flowing to the data input terminal VPAD.

In an embodiment, the initial voltage VINT may be equal to 4V, while the reference voltage VREF may approximately range from 6V to 7V. In the first sub-phase of the reset phase (i.e., phase P0), the initial voltage VINT having a lower voltage is input and received by the light emitting device L2, and thus the light emitting device L2 may be reset to a lower voltage and the unwanted light emission in the reset phase may be avoided. Subsequently, in the second sub-phase of the reset phase (i.e., phase P1), the transistor M4 is turned off and thus the anode voltage of the light emitting device L2 keeps at the lower initial voltage VINT. The reference voltage VREF greater than the initial voltage VINT is input and received at the gate and drain terminals of the transistor M1. Since the reference voltage VREF is not excessively low, the transistor M1 may not be fully turned on to conduct significant current to the data input terminal VPAD. As a result, the current leakage may be reduced to a satisfactory level.

Figure 12C:
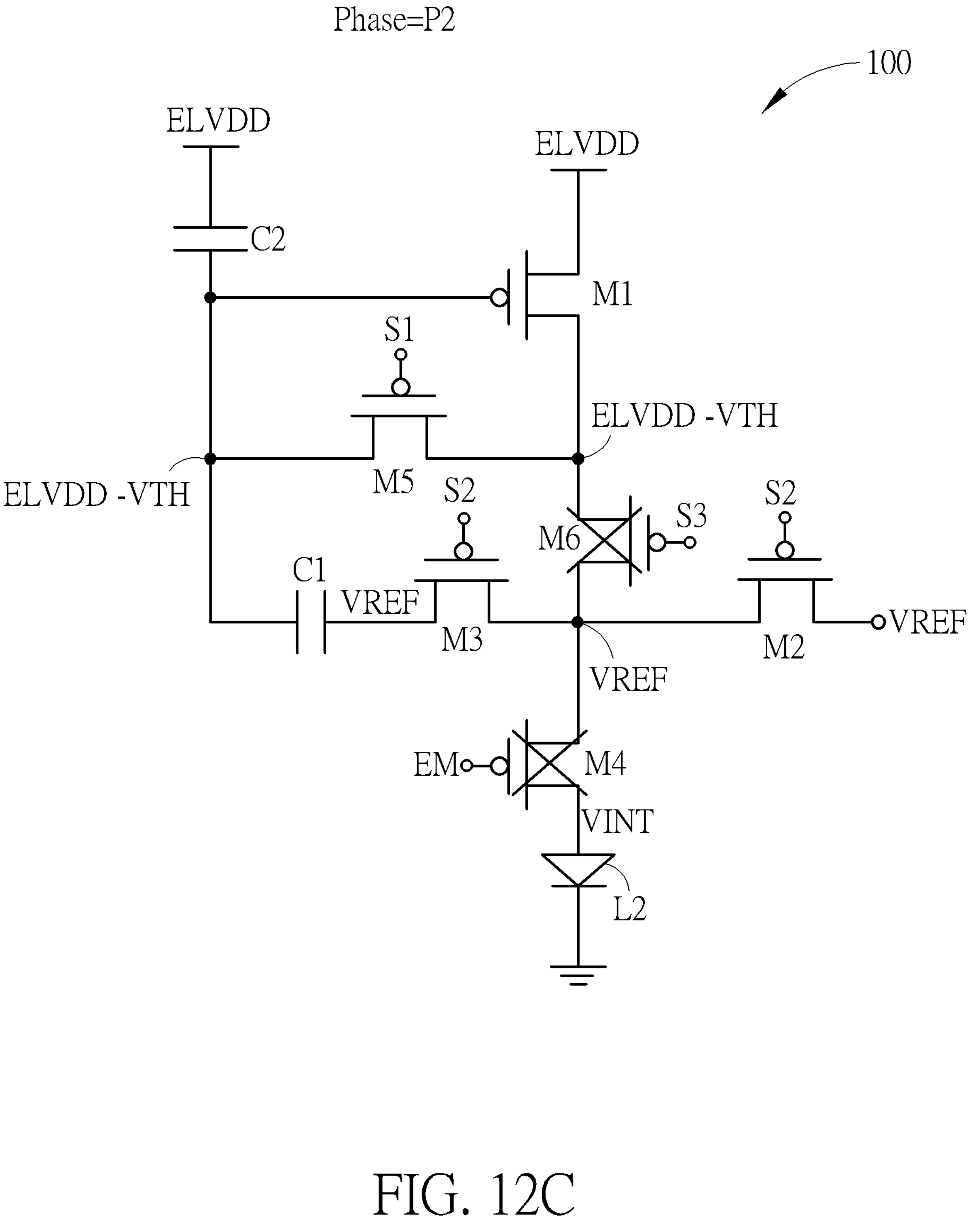

Referring to FIG. 12C along with FIG. 11, in the phase P2, the transistor M6 is turned off, the transistors M2, M3 and M5 keep on, and the transistor M4 keeps off. The phase P2 is used for storing the information of the threshold voltage VTH. More specifically, the source terminal of the transistor M1 receives the power supply voltage ELVDD, causing that the gate voltage of the transistor M1 rises to ELVDD-VTH, and the drain voltage of the transistor M1 also reaches ELVDD-VTH with the conducted transistor M5. The charges corresponding to the gate voltage ELVDD-VTH are thereby stored in the capacitors C1 and C2.

Figure 12D:
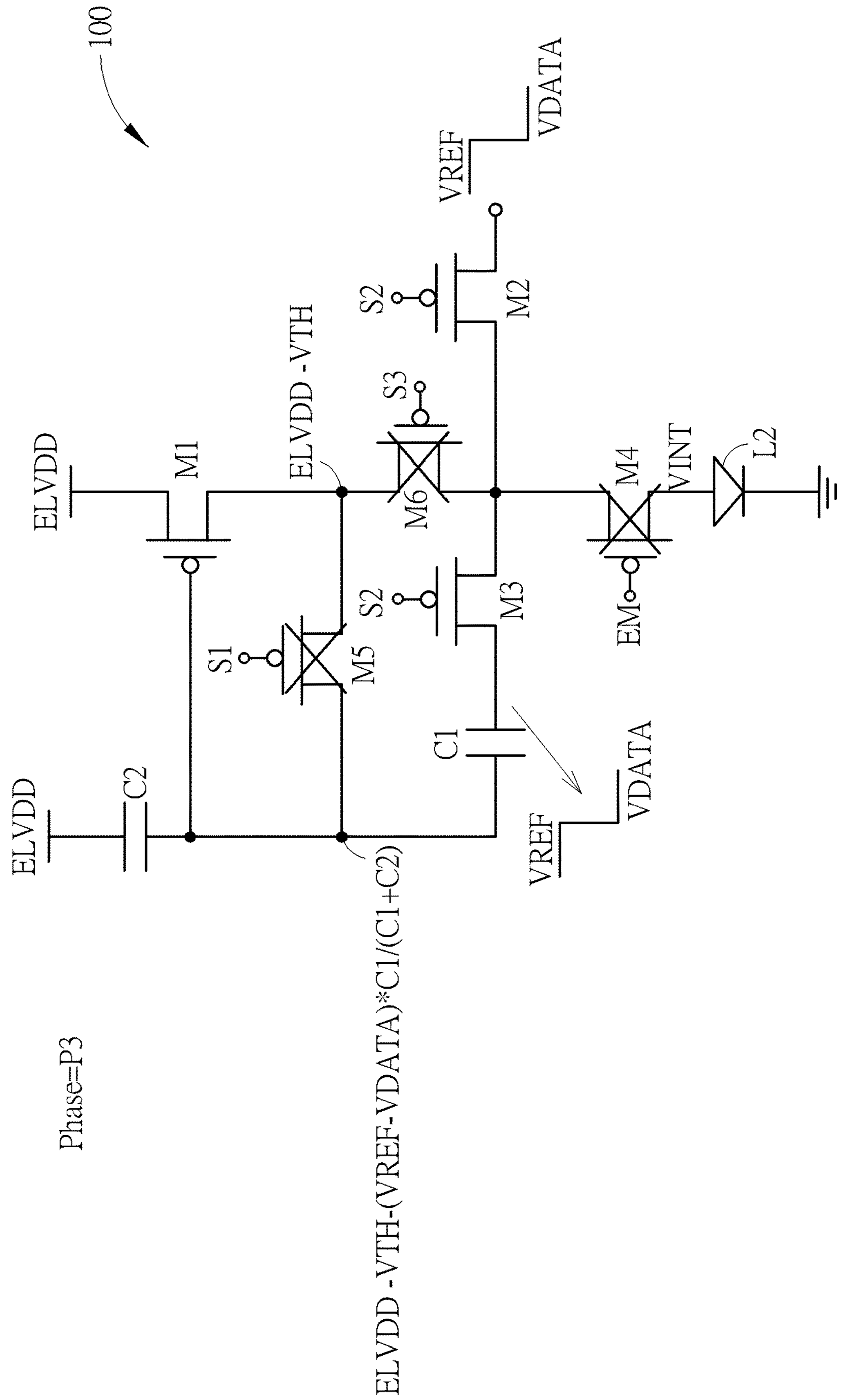

Referring to FIG. 12D along with FIG. 11, in the phase P3, the transistor M5 is turned off, the transistors M2 and M3 keep on, and the transistors M4 and M6 keep off. In this phase, the input data VDATA is input from the data input terminal VPAD. With the conducted transistors M2 and M3, the voltage at the reference node VC may decrease to the input data VDATA, which may be written into the gate terminal of the transistor M1 through the capacitor C1 and. More specifically, the voltage at the reference node VC changes from the reference voltage VREF to the input data VDATA, and this voltage variation may be coupled through the capacitor C1 to the gate terminal of the transistor M1. The gate voltage VG may be calculated based on Equation (3) if the capacitor C2 is omitted in the pixel circuit 100, or the capacitor CP in Equation (3) is replaced by C2 if the capacitor C2 is included in the pixel circuit 100.

In the phase P3, the transistor M6 should be turned off, in order to cut off the current path between the transistors M1 and M2 when the input data VDATA is received. Therefore, the transistor M6 of the pixel circuit 100 may provide similar functions as the transistor M7 of the pixel circuit 70. That is, the transistor M6 may cut off the leakage current path to avoid the voltage division effect on the input data VDATA, so as to ensure the accuracy of the received input data VDATA. The pixel circuit 100 may have additional benefits of fewer transistor count and fewer terminal count (i.e., the reference input terminal may be omitted) in each pixel.

Figure 12E:
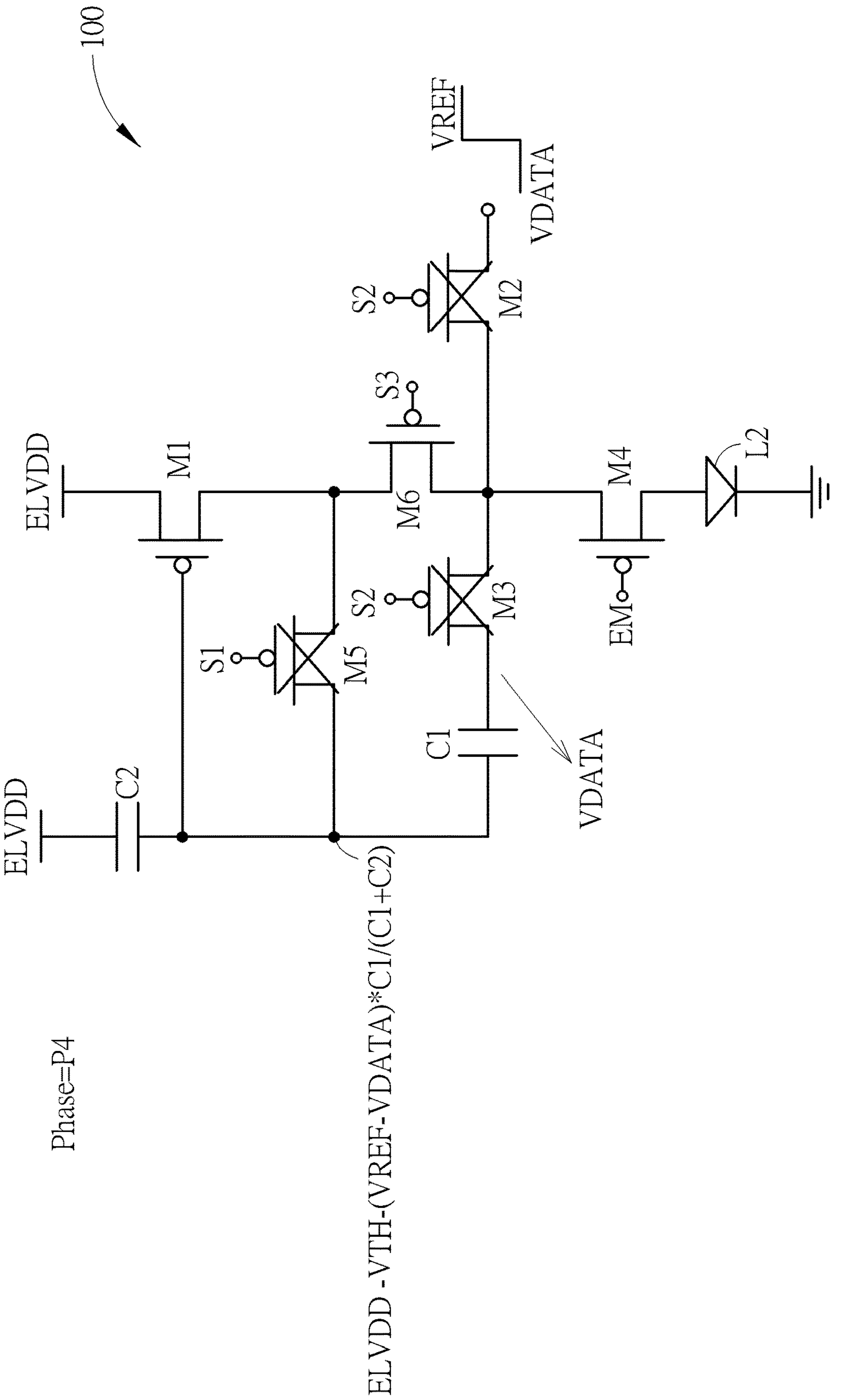

Referring to FIG. 12E along with FIG. 11, in the phase P4, the transistors M4 and M6 are turned on, and other transistors are off. This phase is an emission phase, in which the conducted transistors M4 and M6 allow the driving current ILED to be forwarded to the light emitting device L2, so that the light emitting device L2 may emit light. The magnitude of the driving current ILED may follow the abovementioned Equation (4) for the TFT-based implementation or Equations (5) and (6) for the silicon-based implementation, or follow similar Equation (7) or (8) if the capacitor C2 is included. The details of the calculations are illustrated in the above paragraphs, and will be omitted herein.

Figure 13:
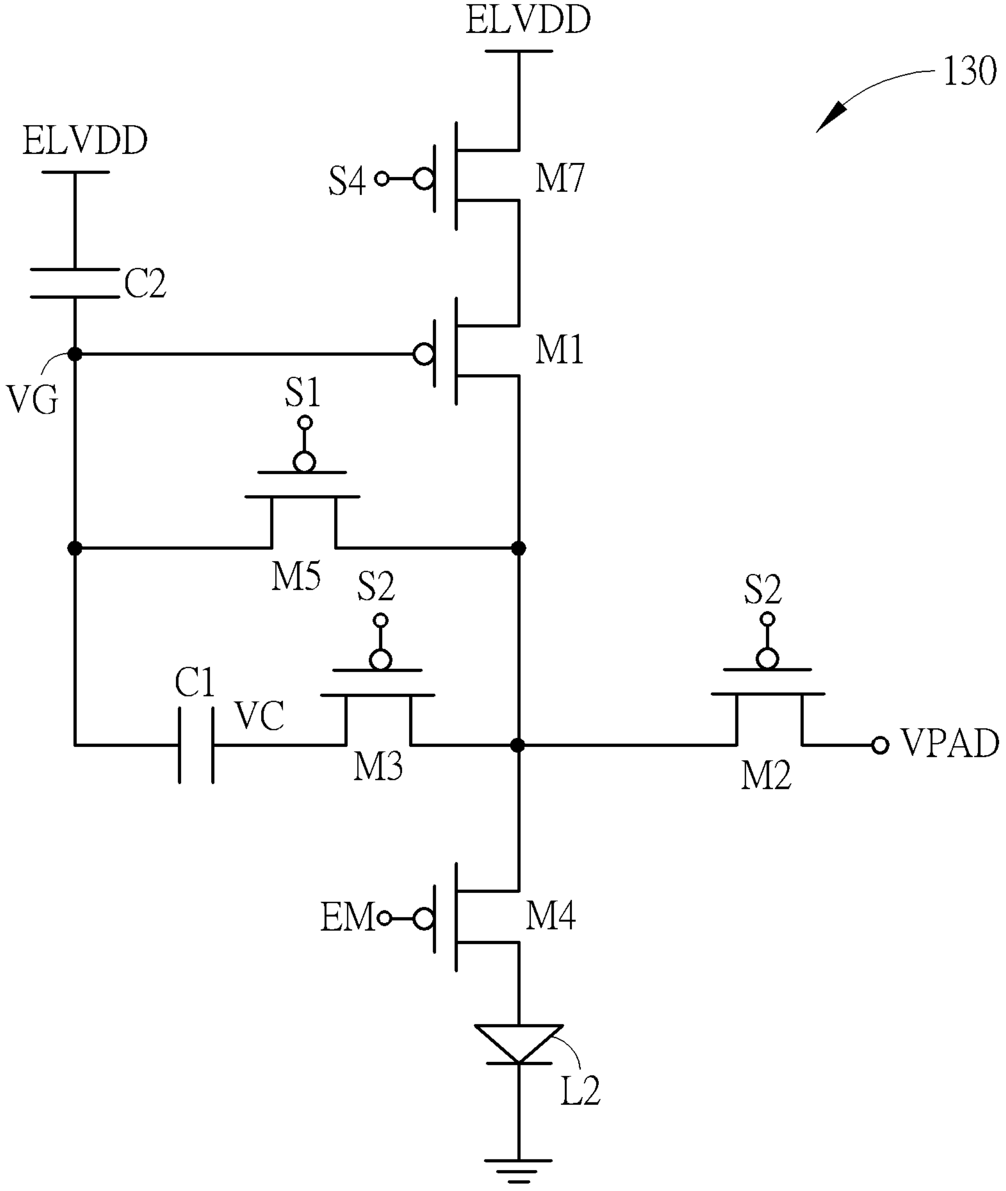
FIG. 13 is a schematic diagram of a pixel circuit of a display panel according to an embodiment of the present invention.

FIG. 13 is a schematic diagram of a pixel circuit 130 of a display panel according to an embodiment of the present invention. The pixel circuit 130 includes transistors M1-M5 and M7, a capacitor C1 and a light emitting device L2. A capacitor C2 may or may not be included in the pixel circuit 130 to generate an appropriate input range under the silicon-based or TFT-based implementation. In the pixel circuit 130, the implementations of the transistors M1-M5, the capacitor C1 and the light emitting device L2 are similar to those of the pixel circuit 100 shown in FIG. 10, and thus not repeated herein. The pixel circuit 130 may further include an additional transistor M7 coupled between the source terminal of the transistor M1 and the power supply terminal. The transistor M7 of the pixel circuit 130 may replace the transistor M6 of the pixel circuit 100 to provide similar functions. The pixel circuit 130 is also a 6T1C structure, which is more cost-saving than the pixel circuits 20 and 70 as described above. Note that the transistor M7 of the pixel circuit 130 and the transistor M7 of the pixel circuit 70 also have similar functions and similar connections. In this embodiment, the transistor M5 is operated by receiving the control signal S1, the transistors M2 and M3 are operated by receiving the control signal S2, the transistor M7 is operated by receiving the control signal S4, and the transistor M4 is operated by receiving the emission control signal EM.

Figure 14:
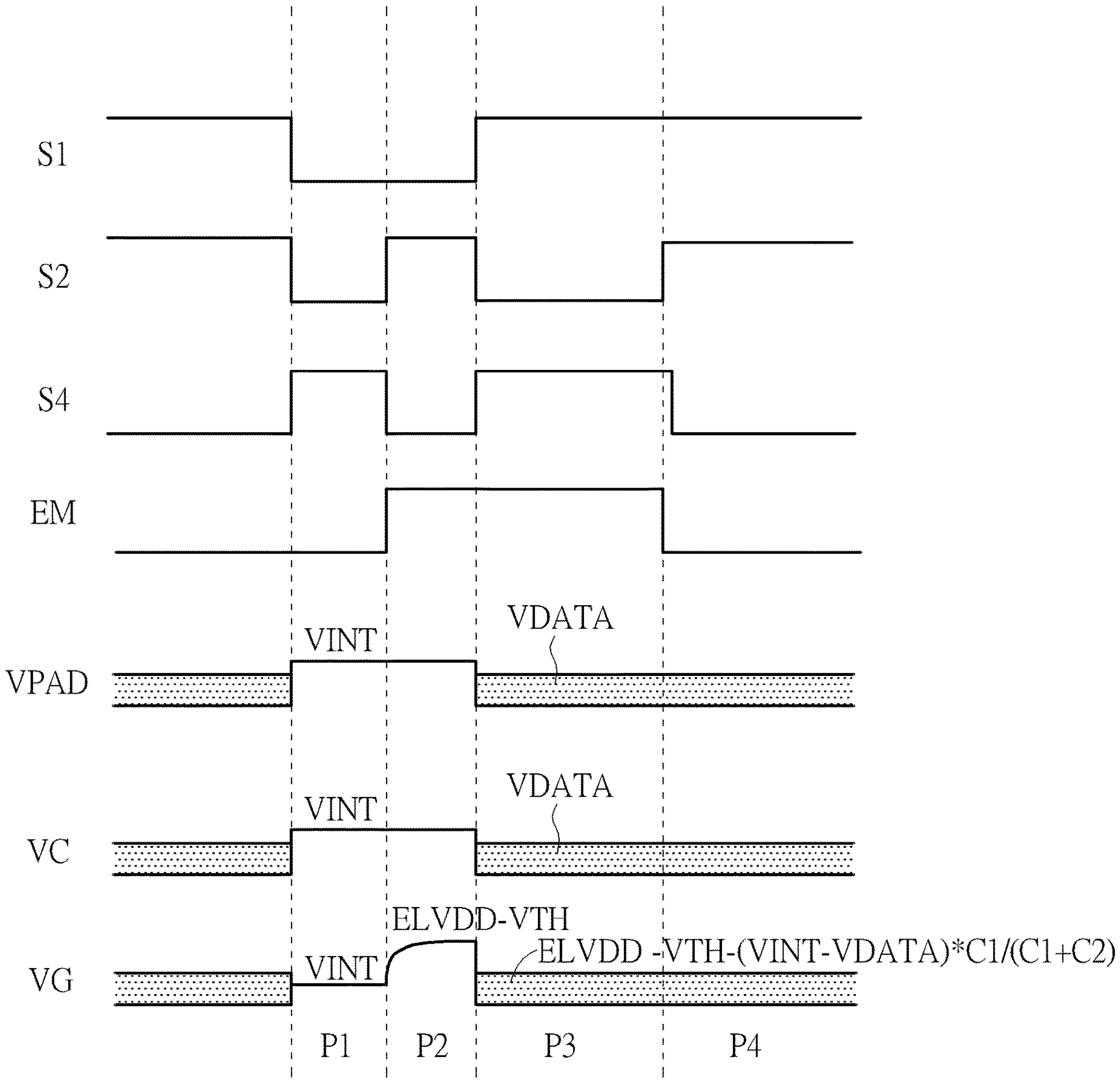
FIG. 14 is a waveform diagram of related signals and voltages of the pixel circuit shown in FIG. 13.
Figure 15A:
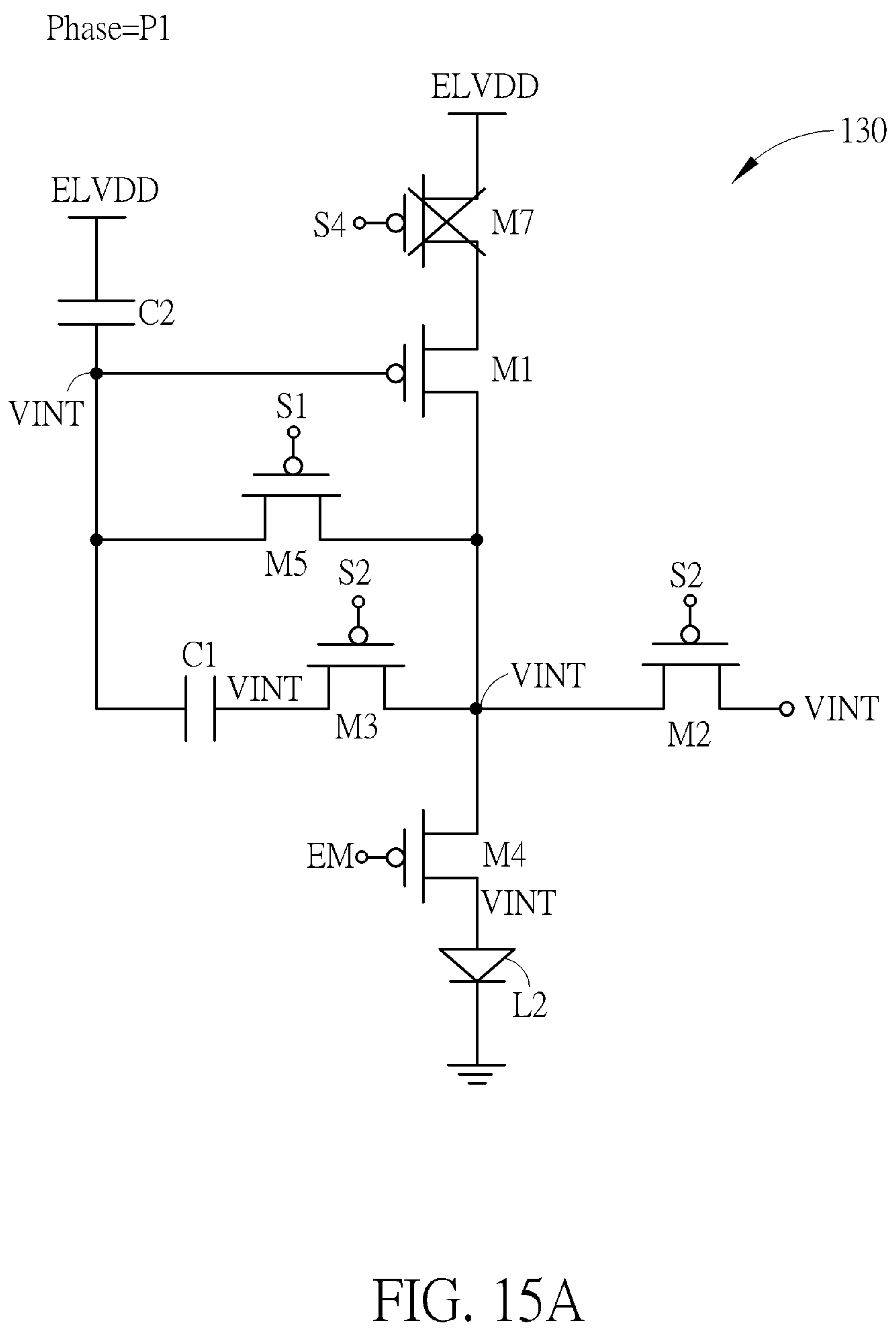
FIG. 15A and FIG. 15B illustrate the operations of the pixel circuit in several phases.
Figure 15B:
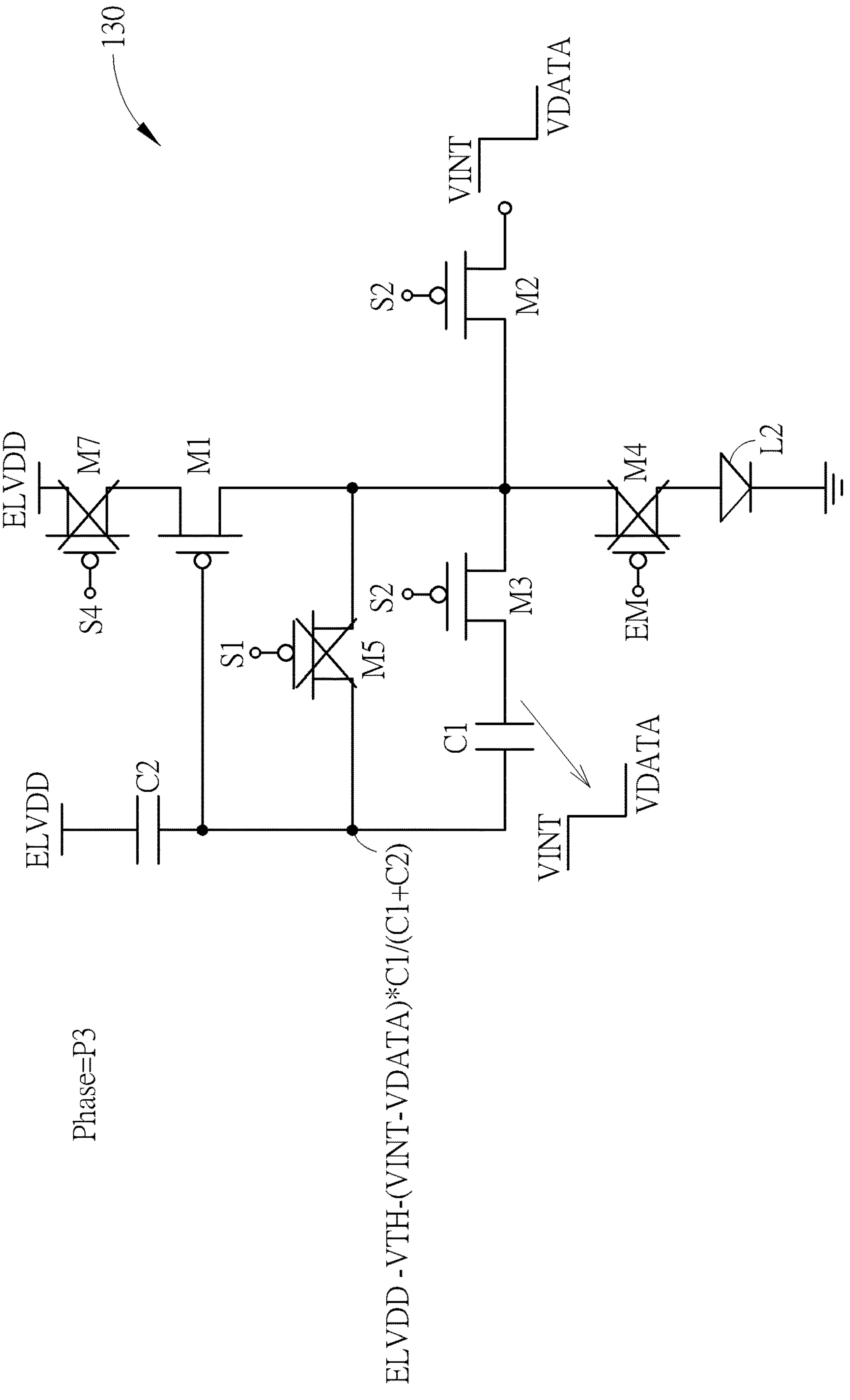

FIG. 14 is a waveform diagram of related signals and voltages of the pixel circuit 130, where the waveforms of the control signals S1, S2 and S4, the emission control signal EM, the voltage of the data input terminal VPAD, the voltage at the reference node VC, and the gate voltage VG of the transistor M1 are shown. FIGS. 15A and 15B illustrate the operations of the pixel circuit 130 in the phases P1 and P3, respectively.

Referring to FIG. 15A along with FIG. 14, in the phase P1 (i.e., the reset phase), the transistors M2-M5 are turned on and the transistor M7 is turned off. The conducted transistors M2-M5 allow the transistor M1 and the light emitting device L2 to be initialized simultaneously. Different from the pixel circuit 100 where the reset phase is divided into two sub-phases and the transistor M1 and the light emitting device L2 are initialized by using different voltages, in the pixel circuit 130, the transistor M1 and the light emitting device L2 are initialized by using the same initial voltage VINT, and their initialization is performed simultaneously in the same phase.

As mentioned above, the transistor M1 of the pixel circuit 100 is initialized by using the reference voltage VREF which may be slightly higher than the initial voltage VINT. Differently, in the pixel circuit 130, the transistor M1 and the light emitting device L2 are both initialized by using the initial voltage VINT. Since the transistor M7 is turned off in the reset phase, the current leakage may be fully avoided by the transistor M7. Therefore, there is no leakage current path from the power supply terminal to the data input terminal VPAD even if the transistor M1 is turned on by the initial voltage VINT, and thus the initial voltage VINT having a lower level is feasible.

The transistor M7 may provide an additional benefit of removing the voltage division effect on the input data VDATA in the scan phase, i.e., the phase P3. Referring to FIG. 15B along with FIG. 14, in the phase P3, the transistor M7 is turned off, and other transistors are operated as similar to those in the pixel circuit 100. The turn-off transistor M7 may cut off the leakage current path from the power supply terminal through the transistors M1 and M2 toward the data input terminal VPAD, so that the data voltage actually input to the reference node VC will be exactly identical to the input data VDATA received at the data input terminal VPAD, so as to improve the accuracy of brightness.

In this embodiment, since the transistor M1 is initialized by using the initial voltage VINT instead of the reference voltage VREF, the gate voltage VG of the transistor M1 in the scan phase will be equal to:

$$VG = ELVDD - VTH - (VINT - VDATA) \times \frac{C1}{C1 + C2}. \tag{9}$$

In the subsequent emission phase, the driving current ILED may be calculated based on the gate voltage VG obtained in Equation (9). The detailed implementations are similar to those described in the above paragraphs, and will be omitted herein.

Please note that the present invention aims at providing a novel pixel circuit for canceling the offset generated from the threshold voltage of the driving transistor. Those skilled in the art may make modifications and alterations accordingly. For example, in the above embodiments, the transistors in the pixel circuit are PMOS transistors; but in other embodiments, similar implementations may be realized by using NMOS transistors or combinations of PMOS and NMOS transistors, where the control signals and the initial voltage may be modified accordingly. In addition, each of the above embodiments is applicable to the TFT process to be implemented on a glass substrate of the display panel, and also applicable to the CMOS process to be implemented in an IC. Further, the pixel circuit of the present invention may be applied to any self-luminous panel, which includes, but not limited to, an OLED panel, mini-LED panel, micro-LED panel, and micro-OLED panel.

To sum up, the present invention provides a pixel circuit for canceling the offset generated from the threshold voltage of the driving transistor. In an embodiment, the input data is input to the pixel circuit through the drain terminal of the driving transistor (i.e., the transistor M1 in this disclosure). In an embodiment, the input data is coupled through a capacitor to the gate terminal of the driving transistor. In an embodiment, the initial voltage and/or the reference voltage is received from the data input terminal that receives the input data. In an embodiment, a transistor (e.g., M7) is coupled to the source terminal of the driving transistor to improve the voltage division effect on the input data and solve the current leakage problem. In an embodiment, a transistor (e.g., M6) is coupled between the drain terminal of the driving transistor and the input transistor to improve the voltage division effect on the input data and solve the current leakage problem. In an embodiment, an additional capacitor is deployed and coupled to the gate terminal of the driving transistor, to improve the voltage swing range when the pixel circuit applies the silicon-based implementation. The information of the threshold voltage may be stored in any capacitor included in the pixel circuit, so as to cancel the effects of the threshold voltage in the emission phase. Several or all of the above implementations may be combined to improve the performance of the pixel circuit. In a preferable embodiment, the pixel circuit may only include 6 transistors, so as to achieve offset cancellation with a simplified circuit structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel circuit of a display panel, comprising:
- a light emitting device;
- a first transistor, comprising a drain terminal, a source terminal and a gate terminal;
- a second transistor, coupled to a data input terminal of the pixel circuit;
- a third transistor, coupled to the second transistor;
- a fourth transistor, coupled between the second transistor and the light emitting device;
- a fifth transistor, coupled between the drain terminal of the first transistor and the gate terminal of the first transistor;
- a sixth transistor, coupled between the second transistor and the drain terminal of the first transistor; and
- a first capacitor, coupled between the third transistor and the gate terminal of the first transistor.

2. The pixel circuit of claim 1, further comprising:
- a second capacitor, coupled to the gate terminal of the first transistor.

3. The pixel circuit of claim 1, wherein in a first sub-phase of a first phase, the second transistor and the fourth transistor are conducted to initialize the light emitting device.

4. The pixel circuit of claim 3, wherein in a second sub-phase of the first phase, the second transistor, the fifth transistor and the sixth transistor are conducted to initialize the first transistor.

5. The pixel circuit of claim 1, wherein a first initial voltage for initializing the light emitting device is smaller than a second initial voltage for initializing the first transistor.

6. The pixel circuit of claim 1, wherein in a second phase, a threshold voltage of the first transistor is generated at the gate terminal of the first transistor and stored in the first capacitor.

7. The pixel circuit of claim 1, wherein in a third phase, the second transistor and the third transistor are conducted to write an input data to the gate terminal of the first transistor through the first capacitor.

8. The pixel circuit of claim 7, wherein in the third phase, the sixth transistor is turned off to cut off a current path between the first transistor and the second transistor when the input data is received.

9. The pixel circuit of claim 1, wherein in a fourth phase, the fourth transistor and the sixth transistor are conducted to forward a driving current to the light emitting device.

10. A pixel circuit of a display panel, comprising:

a light emitting device;

a first transistor, comprising a drain terminal, a source terminal and a gate terminal;

a second transistor, coupled between a data input terminal of the pixel circuit and the drain terminal of the first transistor;

a third transistor, coupled to the second transistor and the drain terminal of the first transistor;

a fourth transistor, coupled between the drain terminal of the first transistor and the light emitting device;

a fifth transistor, coupled between the drain terminal of the first transistor and the gate terminal of the first transistor;

a sixth transistor, coupled between the source terminal of the first transistor and a power supply terminal; and a first capacitor, coupled between the third transistor and the gate terminal of the first transistor.

11. The pixel circuit of claim 10, further comprising:

a second capacitor, coupled to the gate terminal of the first transistor.

12. The pixel circuit of claim 10, wherein in a first phase, the second transistor, the fourth transistor and the fifth transistor are conducted to initialize the first transistor and the light emitting device.

13. The pixel circuit of claim 12, wherein the first transistor and the light emitting device are initialized by using a same initial voltage.

14. The pixel circuit of claim 10, wherein in a second phase, a threshold voltage of the first transistor is generated at the gate terminal of the first transistor and stored in the first capacitor.

15. The pixel circuit of claim 10, wherein in a third phase, the second transistor and the third transistor are conducted to write an input data to the gate terminal of the first transistor through the first capacitor.

16. The pixel circuit of claim 15, wherein in the third phase, the sixth transistor is turned off to cut off a current path through the first transistor and the second transistor when the input data is received.

17. The pixel circuit of claim 10, wherein in a fourth phase, the fourth transistor and the sixth transistor are conducted to forward a driving current to the light emitting device.

18. A pixel circuit of a display panel, comprising:

a light emitting device;

a first transistor, comprising a drain terminal, a source terminal and a gate terminal;

a second transistor, coupled between a data input terminal of the pixel circuit and the drain terminal of the first transistor;

a third transistor, coupled between the drain terminal of the first transistor and a reference node;

a fourth transistor, coupled between the drain terminal of the first transistor and the light emitting device;

a fifth transistor, coupled between the drain terminal of the first transistor and the gate terminal of the first transistor;

a sixth transistor, coupled between the reference node and a reference input terminal; and a first capacitor, coupled between the reference node and the gate terminal of the first transistor.

19. The pixel circuit of claim 18, further comprising:

a second capacitor, coupled to the gate terminal of the first transistor.

20. The pixel circuit of claim 18, wherein in a first phase, the second transistor, the fourth transistor and the fifth transistor are conducted to initialize the first transistor and the light emitting device.

21. The pixel circuit of claim 20, wherein the first transistor and the light emitting device are initialized by using a same initial voltage.

22. The pixel circuit of claim 18, wherein in a second phase, a threshold voltage of the first transistor is generated at the gate terminal of the first transistor and stored in the first capacitor.

23. The pixel circuit of claim 18, wherein in a third phase, the second transistor and the third transistor are conducted to write an input data to the gate terminal of the first transistor through the first capacitor.

24. The pixel circuit of claim 18, wherein in a fourth phase, the fourth transistor is conducted to forward a driving current to the light emitting device.

25. The pixel circuit of claim 18, further comprising:

a seventh transistor, coupled between the source terminal of the first transistor and a power supply terminal.

26. The pixel circuit of claim 18, wherein the sixth transistor receives a reference voltage from the reference input terminal, and the data input terminal is at the reference voltage before receiving an input data.

* * * * *